US010897860B2

(12) United States Patent
Ferras

(10) Patent No.: US 10,897,860 B2
(45) Date of Patent: Jan. 26, 2021

(54) IRRIGATION MONITORING AND CONTROL BASED ON EFFICIENCY MODEL

(71) Applicant: Dish Network L.L.C., Englewood, CO (US)

(72) Inventor: Leo James Ferras, Oregon House, CA (US)

(73) Assignee: Dish Network L.L.C., Englewood, CO (US)

( * ) Notice: Subject to any disclaimer, the term of this patent is extended or adjusted under 35 U.S.C. 154(b) by 32 days.

(21) Appl. No.: 16/287,730

(22) Filed: Feb. 27, 2019

(65) Prior Publication Data
US 2020/0267915 A1 Aug. 27, 2020

(51) Int. Cl.
*A01G 25/16* (2006.01)
*G05B 19/042* (2006.01)

(52) U.S. Cl.
CPC ......... *A01G 25/165* (2013.01); *A01G 25/167* (2013.01); *G05B 19/042* (2013.01); *G05B 2219/2625* (2013.01)

(58) Field of Classification Search
CPC ..... A01G 25/167; A01G 25/165; G06N 20/00
See application file for complete search history.

(56) References Cited

U.S. PATENT DOCUMENTS

| 5,870,302 A * | 2/1999 | Oliver | A01G 25/167 700/11 |
| 8,862,277 B1 * | 10/2014 | Campbell | A01G 25/167 324/664 |
| 2005/0194461 A1 * | 9/2005 | Goldberg | A01G 25/167 239/63 |
| 2010/0179701 A1 * | 7/2010 | Gilbert | A01G 25/16 700/284 |
| 2012/0303168 A1 * | 11/2012 | Halahan | G05B 15/02 700/284 |
| 2013/0226357 A1 * | 8/2013 | Ersavas | B05B 12/04 700/284 |
| 2016/0198645 A1 * | 7/2016 | Weatherill | A01G 25/167 700/284 |
| 2017/0269016 A1 * | 9/2017 | Anjum | A01G 25/167 |

* cited by examiner

*Primary Examiner* — Mark A Connolly
(74) *Attorney, Agent, or Firm* — Seed IP Law Group LLP

(57) ABSTRACT

Technologies disclosed herein are provided for irrigation monitoring and controlling based on water usage monitoring and control using an efficiency model for a defined geographic region. The technology includes receiving a first and a second set of moisture sensor measurements from a set of moisture sensors located in a defined geographic region, and determining an amount of water that is applied to the defined geographic region at a time period between the first and the second set of moisture measurements. An efficiency model representing efficiencies of locations in the defined geographic region is obtained based on the first and second set of moisture measurements and the amount of water applied. Schedule information is generated based on the efficiency model that indicates time periods at which areas in the defined geographic region are to be watered.

19 Claims, 11 Drawing Sheets

IRRIGATION MONITORING AND CONTROL BASED ON EFFICIENCY MODEL

BACKGROUND

Technical Field

The present disclosure relates to irrigation and, more specifically, to systems and methods for monitoring and controlling water usage for irrigation purposes.

Description of the Related Art

Lawn care is an important practice to those who wish to maintain a verdant lawn, but it is sometimes difficult to achieve an appropriate level of irrigation for a yard. Grass that does not receive enough water over time may become discolored or even die. Over watering, on the other hand, may not only kill the grass but will also deplete the soil of oxygen, reducing fertility of the soil or promoting the growth of fungus or other undesirable flora. However, even when some areas of a lawn are appropriately irrigated, other areas may be over or under watered. For instance, different areas of a yard may receive different amounts of sunlight, may have different soil compositions, or may retain moisture differently due to drainage. These and other factors may make some parts of a lawn more or less efficient to water than others. Over time, these differences can lead to disparate results for different areas of a lawn even if the lawn is uniformly watered.

Determining when to water the lawn to account for these differences is a complex challenge. Even if a sprinkler system is automatically turned on when a moisture level of one area of a yard is low, other areas of the yard may still receive water that does not need irrigation. Manually placing and operating sprinklers in certain areas based on current moisture level of the areas requires significant attention and user presence to place and activate sprinklers when needed. Even in scenarios where lawns may be automatically watered, such automatic watering may be unnecessary at times when the weather forecast indicates that precipitation for the area is likely in the near future. Moreover, such approaches do not consider the monetary cost of irrigation or the cumulative water usage for a residence in a given period of time. Further, an application that monitors water usage, moisture levels of different areas, and facilitates water usage scheduling via a user interface appear to be unavailable in current outlets (e.g., Google Play, Apple App store). The aforementioned problems may extend to crop growth, gardening, and other settings in which plants have even more sensitivity to moisture content than grass.

BRIEF SUMMARY

A method, may be summarized as including receiving, by a computer system over a network, first moisture measurements from a set of moisture sensors indicating amounts of moisture measured at first locations in a defined geographic region at a first time; determining, by the computer system, an amount of water applied to the defined geographic region over a first period of time after the first time; receiving, by the computer system over the network, second moisture measurements from the set of moisture sensors indicating amounts of moisture measured at the first locations in the defined geographic region at a second time after the first period of time; generating, by the computer system, an efficiency model of the defined geographic region based on the set of first moisture measurements, the set of second moisture measurements, and the amount of water applied; generating, by the computer system, schedule information indicating future periods of time at which water is to be applied to areas in the defined geographic region based on the efficiency model; and sending the schedule information over the network.

The method may further include receiving information defining a plurality of zones of the defined geographic region and information indicating the first locations of the set of moisture sensors; and associating, in memory of the computer system, the first locations of each of the set of moisture sensors and the information defining the plurality of zones with areas in a region image corresponding to the defined geographic region.

The method may further include receiving information identifying a plurality of zones of the defined geographic region and information indicating second locations of a set of water distribution devices in the defined region, wherein the amount of water is applied by the set of water distribution devices. The efficiency model may be generated based on differences, for each of the set of sensors, between corresponding measurements of the set of second moisture measurements and the set of first moisture measurements, and based on the amount of water applied over the period of time.

The method may further include obtaining weather forecast information for the defined geographic region; receiving, by the computer system over the network, third moisture measurements from the set of moisture sensors indicating the amounts of moisture measured at the first locations in the defined geographic region at a third time after the second time; and generating the schedule information based on the efficiency model, the weather forecast information, and the third moisture measurements. The schedule information may include instructions for a network device connected to a second network to transmit a communication at a defined time causing one or more devices to apply water to the defined geographic region, and instructions for the network device to transmit a communication at a second defined time causing the one or more devices to stop applying water to the defined geographic region.

The method may further include receiving a communication indicating amounts of water applied in the defined geographic region at one or more second periods of time after the first period of time; storing, in memory, current cumulative usage information representative of the amounts of water applied at the one or more second periods of time; and transmitting, to a second computing system over the network, a notification as a result of current cumulative usage exceeding a usage threshold defined in the memory.

The method may further include determining, for each zone of the plurality of zones, a usage threshold based on the efficiency model and cumulative usage information representative of the amounts of water applied at one or more second periods of time after the first period of time, wherein the scheduling information provides a schedule of water usage below the usage threshold.

The method may further include determining, for each zone of the plurality of zones, a usage threshold based on the efficiency model and cumulative usage information representative of the amounts of water applied at one or more second periods of time after the first period of time; receiving a communication indicating amounts of water applied in the defined geographic region at one or more second periods of time after the first period of time; and transmitting, to a second computing system over the network, a communication indicating a violation of a water usage restriction as a result of determining that the amounts of water applied at the one or more second periods of time exceed the usage threshold.

The method may further include receiving, by the computer system, over the network, third moisture measurements from the set of moisture sensors indicating the amounts of moisture measured at the first locations in the defined geographic region at a third time after the second time; and sending a communication causing a second amount of water to be applied to the defined geographic region in response to receiving the third moisture measurements. The efficiency model may include a plurality of efficiency metrics for the first locations in the defined geographic region, the efficiency model being a data structure representative of a response of soil at the first locations in the defined geographic region to the application of amounts of water A system may be summarized as including one or more processors; a first network adapter configured to communicate over a first network; and memory storing a set of instructions that, as a result of execution by the one or more processors, cause the system to receive, via the first network adapter, first moisture measurements by a set of moisture sensors indicating amounts of moisture measured at first locations in a defined geographic region at a first time; determine an amount of water applied to the defined geographic region over a period of time after the first time; receive, via the first network adapter, second moisture measurements from the set of moisture sensors indicating the amounts of moisture measured at the first locations in the defined geographic region at a second time after the period of time; obtain schedule information indicating future periods of time at which water is to be applied to areas in the defined geographic region based on an efficiency model of the defined geographic region, the efficiency model being generated based on the set of first moisture measurements, the set of second moisture measurements, and the amount of water applied; and send the schedule information to a mobile device over the first network.

The system may further include a second network adapter configured to communicate over a second network, wherein the memory stores further instructions that, as a result of execution by the one or more processors, cause the system to receive, from the mobile device over the first network, location information identifying a location of the defined geographic region; and send, over the second network, a request including the location information to a remote server to obtain a region image of the defined geographic region.

The instructions, as a result of execution by the one or more processors, may further cause the system to receive, from the mobile device over the first network, a communication including information defining a plurality of zones in the defined geographic region, and information indicating locations of one or more devices in the defined geographic region; and define, based on the communication, areas in the region image corresponding to the plurality of zones and device locations in the region image corresponding to the locations of the one or more devices.

The instructions, as a result of execution by the one or more processors, may further cause the system to generate the efficiency model based on differences, for each of the set of sensors, between corresponding measurements of the set of second moisture measurements and the set of first moisture measurements, and based on the amount of water applied over the period of time The memory may store further instructions that, as a result of execution by the one or more processors, cause the system to obtain weather forecast information for the defined geographic region; receive, over the network, third moisture measurements from the set of moisture sensors indicating the amounts of moisture measured at the first locations in the defined geographic region at a third time after the second time; and generate the schedule information based on the efficiency model, the weather forecast information, and the third moisture measurements.

The memory may store further instructions that, as a result of execution by the one or more processors, cause the system to transmit a communication, over the first network, at a defined time specified in the scheduling information to one or more water distribution devices to apply water to the defined geographic region, and transmit a communication at a second defined time specified in the scheduling information to stop applying water to the defined geographic region.

The system may further include a second network adapter configured to communicate over a second network, wherein the memory stores further instructions that, as a result of execution by the one or more processors, cause the system to send, to a remote server over the second network, a request for the schedule information, the request including information regarding the first moisture measurements, the second moisture measurement, and the amount of water applied to the geographic region over the period of time; and receive, over the second network, the schedule information from the remote server in response to the request.

The instructions, as a result of execution by the one or more processors, may further cause the system to calculate a moisture differential based on the set of first moisture measurements and the set of second moisture measurements, generate an efficiency model based on the moisture differential and the amount of water applied, and generate the schedule information based on the efficiency model.

A non-transitory computer-readable medium storing instructions that are executable on one or more processors of a system to cause the system to perform operations may be summarized as including receiving, by the system over a network, first moisture measurements by a set of moisture sensors indicating amounts of moisture measured at first locations in a defined geographic region at a first time; determining, by the system, an amount of water applied to the defined geographic region over a period of time after the first time; receiving, by the system over the network, second moisture measurements from the set of moisture sensors indicating amounts of moisture measured at the first locations in the defined geographic region at a second time after the period of time; generating, by the system, an efficiency model of the defined geographic region based on the set of first moisture measurements, the set of second moisture measurements, and the amount of water applied; generating, by the system, schedule information indicating future periods of time at which water is to be applied to areas in the defined geographic region based on the efficiency model; and sending the schedule information over the network to a mobile device.

The instructions may be executable to further cause the system to obtain information defining a plurality of zones of the defined geographic region and information indicating the first locations of the set of moisture sensors; and associate, in memory of the computer system, the first locations of each of the set of moisture sensors and the information defining the plurality of zones with areas in a region image corresponding to the defined geographic region.

The instructions may be executable to further cause the system to receive, over the network, third moisture measurements from the set of moisture sensors indicating the amounts of moisture measured at the first locations in the defined geographic region at a third time after the second time; and send a communication that causes a second amount of water to be applied to the defined geographic region in response to receiving the third moisture measurements.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks and the environment, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

References to the term "set" (e.g., "a set of items"), as used herein, unless otherwise noted or contradicted by context, is to be construed as a nonempty collection comprising one or more members or instances. References to the term "subset" (e.g., "a subset of the set of items"), as used herein, unless otherwise noted or contradicted by context, is to be construed as a nonempty collection comprising one or more members or instances of a set or plurality of members or instances.

Figure 1:
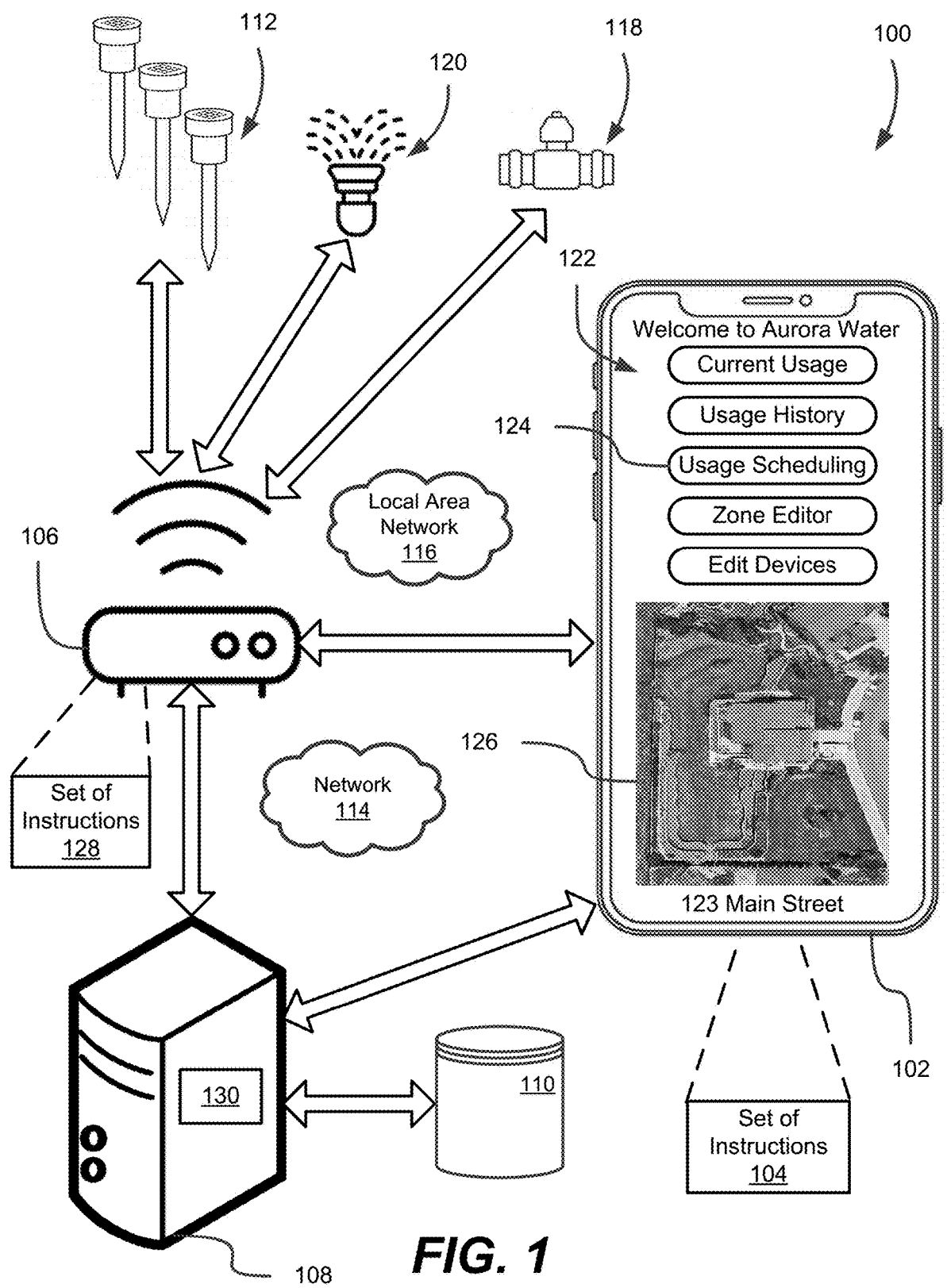
FIG. 1 is an environment in which devices interact to create a schedule for watering areas in a defined geographic region according to one or more embodiments.

FIG. 1 show an environment 100 in which irrigation of an area of land may be monitored and/or controlled according to one or more embodiments. The environment 100 includes a mobile device 102 having memory storing a set of instructions 104 for implementing an application, a network device 106, a remote server 108 communicatively coupled with data storage 110, and a set of moisture sensors 112. The server 108 may be connected to and communicate with the network device 106 and/or the mobile device 102 over one or more networks 114, which may include a cellular network, a wide area network, and the internet. The network device 106, the set of moisture sensors 112, and the mobile device 102 may be connected to and wirelessly communicate with each other over a local area network (LAN) 116. The LAN 116 may include one or more intermediate network nodes (e.g., repeaters) to help ensure reliable communications in the LAN 116

The environment 100 may also include a set of water flow measurement devices 118 that measure an amount of water flowing to the defined geographic region 202 (see FIG. 2) or a portion thereof over time. The water flow measurement devices 118 may include a disk meter, gear meter, paddle wheel meter, or any other known appropriate mechanism for gauging an amount of water flowing through a volume. The water flow measurement devices 118 may have threaded ends attachable to a spigot, hose, or other water source. In some embodiments, one of the water flow measurement devices 118 may be a water meter provided by a municipal water utility. In some embodiments, one of the water flow measurement devices 118 may be a device that connects with a water meter provided by a municipal water utility, obtains information therefrom regarding amounts of water flow, and provides the information to the network device 106.

The water flow measurement devices 118 may also include a wireless communication transmitter for transmitting information to the network device 106 regarding measurements of an amount of water flow. Specifically, communications transmitted by the water flow measurement devices 118 may include information representative of the amount of water flowing through a volume in a given period of time. The wireless communication transmitter may include a Wi-Fi transmitter, an ANT transmitter, a ZigBee® transmitter, a Bluetooth transmitter, radio frequency transmitter, or other such short-range transmitter used to communicate over the LAN 116. The water flow measurement devices 118 may also be configured to transmit identification information specific to the water flow measurement devices 118, such as an alphanumeric value or serial number associated with the respective water flow measurement device 118. Such identification information may be associated with each communication sent by the water flow measurement devices 118. The communications transmitted by the moisture sensors may be encoded according to any appropriate communication protocol, such as the Bluetooth communication protocol, IEEE 802 protocol, or the ZigBee protocol. The moisture sensors 112 may include a rechargeable battery and may include additional features to charge the battery, such as a photovoltaic solar panel or a universal serial bus port.

In some embodiments, the water flow measurement device 118 may include a wireless communication transceiver that is configured to receive communications according to the foregoing communication standards and protocols (e.g., Bluetooth, ZigBee). The water flow measurement device 118 may receive, from the network device 106 via the transceiver, a request for the water flow measurement device 118 to provide information regarding a current amount of water applied for a given time period. For instance, the water flow measurement device 118 may include memory storing information regarding an amount of water flowing therethrough for a given period of time, such as a billing cycle. In response to the request, the water flow measurement device 118 may obtain and transmit the requested water usage information to the network device 106.

The environment 100 may include a set of water distribution devices 120, such as a set of valves and/or a set of sprinklers or other similar devices that control the flow of or distribute water from a water source. In some embodiments, the set of distribution devices 120 may include a wireless receiver for communicatively coupling to the network device 106 over the LAN 116 according to the short range wireless communication protocols and methods described above (e.g., Bluetooth, Wi-Fi, ZigBee). In such embodiments, the distribution devices 120 may be respectively configured to selectively permit, prevent, or otherwise control the flow of water therethrough in response to receiving communications from the network device 106. For instance, the distribution devices 120 may include a set of sprinklers configured to selectively distribute water in response to receiving communications from the network device 106. As another example, the water distribution devices 120 may include a set of valves sprinklers configured to selectively permit or prevent water flow therethrough in response to receiving communications from the network device 106. In some embodiments, the sprinklers may be manually operated conventional sprinklers.

In some embodiments, a water distribution device 120 may be combined with a water flow measurement device 118. The combination device may selectively remotely permit and prevent the flow of water therethrough and also measure an amount of water flowing therethrough.

The network device 106, the set of moisture sensors 112, the set of water flow measurement devices 118 (if included), the set of water distribution devices 120 (if included), and the mobile device 102 may be located in a defined geographic region 202, such as a residential property. The defined geographic region 202, for example, corresponds to a contiguous lot of land on which grass, trees, shrubs, etc., are planted and which is owned by a single entity (e.g., person, corporation).

The mobile device 102 may be a smartphone, tablet computer, or other such device having a display, which may be a touchscreen interface. The set of instructions 104, as a result of execution by one or more processors of the mobile device 102, may cause the mobile device 102 to perform one or more operations described herein. The set of instructions 104, for example, may cause the mobile device 102 to display a graphical user interface 122 representative of at least some of the set of instructions 104. A user may interact with various elements of the user interface 122 to cause the mobile device 102 to perform operations corresponding to the set of instructions 104. The user interface 122 may be a component of an application or program that is accessible via an operating system of the mobile device 102.

The user interface 122 may include a set of interface elements 124, which may be depicted as buttons, menus, scrollbars, etc., that the user may interact with to access or edit information associated with or included in the set of instructions 104. The user interface 122, for instance, includes a "current usage" element for accessing information regarding current water usage, a "usage history" element for accessing information regarding historical or past water usage, a "usage scheduling" element for accessing information regarding water usage scheduling information, a "zone editor" element for editing information regarding zones within the defined geographic region 202, and an "add devices" element for editing information regarding devices located in the defined geographic region 202. The user interface 122 may also provide other information regarding the defined geographic region 202, such as a region image 126 showing an overhead view of the defined geographic region 202 and that may show zones and/or devices located therein, as described below. The user interface 122 may include more or fewer objects than the non-limiting examples described herein without departing from the scope of the present disclosure.

The network device 106 is a processor-based device having memory storing a set of instructions 128 that, as a result of execution by the one or more processors of the network device 106, cause the network device 106 to perform one or more operations described herein. The network device 106 has one or more network adapters and is configured to wirelessly connect the processor-based devices (e.g., mobile device 102, set of moisture sensors 112) together on the LAN 116 and facilitate communications between the processor-based devices. For example, the network device 106 may have a first network adapter and be configured, via execution of the set of instructions 128, to serve as a hub or router that receives communications from the set of moisture sensors 112 regarding moisture measurements and transmits communications to the mobile device 102. The network device 106 may also receive communications from the mobile device 102 for controlling devices and send communications to the set of valves 118 and/or the set of sprinklers 120 for controlling application of water in response. The set of instructions 126 may be organized into a single component, such as an application or program, and may cause the network device 106 to be a special-purpose device that performs as described herein.

The network device 106 may also serve as an intermediary between the server 108 and the aforementioned devices connected to the LAN 116. The network device 106 may have a second network adapter for sending and receiving communications to and from the server 108 based on communications by the network device 106 with the mobile device 102, the set of moisture sensors 112, and/or the water distribution devices 120. For instance, the network device 106 may send communications regarding moisture measurements to the server 108 as a result of receiving a communication from the mobile device 102. The network device 106 may also send communications to the water application control elements and/or the mobile device 102 based on communications received from the server 108. As one example, the network device 106 may receive scheduling information from the server 108 and send the scheduling information over the LAN 116 to the mobile device 102.

In some situations, the mobile device 102 may not be connected to the LAN 116—for instance, when the user is away from the home and connected to the network 114. In such situations, the network device 106 may facilitate communications with devices connected to the LAN 116 and the mobile device 102 via the server 108. In particular, the server 108 may communicate with the mobile device 102 via the network 114 and the server 108 may also communicate with the network device 106 over the network 114 to allow monitoring and/or control of the devices connected to the LAN 116 while the user is away from the property.

The server 108 is a processor-based device located remotely from the defined geographic region 202 and that stores a set of instructions 130 that, as a result of execution by one or more processors of the server 108, cause the server 108 to perform one or more operations described herein. The server 108 is a cloud-based entity that communicates over the network(s) 114 with the network device 106, the mobile device 102 (if disconnected from the LAN 116), and other cloud-based entities. The server 108 may also be communicatively coupled to data storage 110, which may be a database or other memory storing data and/or data structures representative of various aspects of the defined geographic region 202 and the devices associated therewith.

The set of instructions 130 may cause the server 108 to receive information from network devices 106 and/or mobile device(s) 102 over the network 114 and process the information to perform various operations and tasks. The server 108, for example, may generate an efficiency model for the defined geographic region 202 based on moisture measurements before and after a known amount of water is applied to the defined geographic region 202. Based at least in part on the efficiency model, the server 108 may generate water usage scheduling information for applying water to the defined geographic region 202, as described below. The scheduling information, in some embodiments, may include information that causes the network device 106 to transmit communications for causing respective water application control elements to distribute or permit the flow of water in the defined geographic region 202. In some embodiments, the efficiency model and/or the scheduling information may be generated by the network device 106.

The set of instructions 130 may also cause the server 108 to obtain information from other cloud-based entities. As one example, the server 108 may obtain weather data regarding current meteorological and weather conditions (e.g., temperature, precipitation) as well as forecasted meteorological and weather conditions for the defined geographic region 202. As a further example, the server 108 may communicate with municipal water utility entities to obtain price scheduling and/or current water usage information for the defined geographic region 202 (e.g., recent water meter readings). The price scheduling information may indicate prices per gallon for water usage based on current cumulative water usage for a defined period of time.

The set of moisture sensors 112 each include an element that measures the volumetric water content of soil. The moisture sensors 112 may include an elongated probe portion for insertion into a depth of soil to be measured. The moisture sensors 112 may also include a wireless communication transmitter for transmitting information to the network device 106 regarding measurements of soil moisture. Specifically, communications transmitted by the moisture sensors 112 may include information representative of the water content of the soil being measured. The wireless communication transmitter and protocols used by the set of moisture sensors 112 is described above in detail so further discussion thereof is omitted. The set of moisture sensors 112 may also be configured to transmit identification information specific to each moisture sensor, such as an alphanumeric value or serial number associated with an individual moisture sensor. Such identification information may be associated with each communication sent by the moisture sensors 112. The moisture sensors 112 may include a rechargeable battery and may include additional features to charge of the battery, such as a photovoltaic solar panel or a universal serial bus port. The moisture sensors 112 may also include other sensor elements, such as a temperature sensor, a light sensor, or a humidity sensor, providing measurements regarding conditions at locations in the defined geographic region 202 to the network device 106 as described herein.

In some embodiments, the moisture sensors 112 may respectively include a wireless communication transceiver that is configured to receive communications according to the foregoing communication standards and protocols (e.g., Bluetooth, ZigBee). The moisture sensors 112 may receive, from the network device 106 via the transceiver, a request for the moisture sensors 112 to provide information regarding moisture levels measured by the moisture sensor 112. For instance, the request may be for the moisture sensor 112 to provide information regarding a current detected moisture level in the soil. In some embodiments, the moisture sensors 112 may include memory storing information regarding a plurality of moisture level measurements taken over time. The moisture sensors 112 may provide information to the network device 106 regarding a plurality of measurements taken over time. In response to the request, the moisture sensors 112 may obtain and transmit the requested information regarding current detected moisture levels or a plurality of measurements taken over time to the network device 106.

Figure 2:
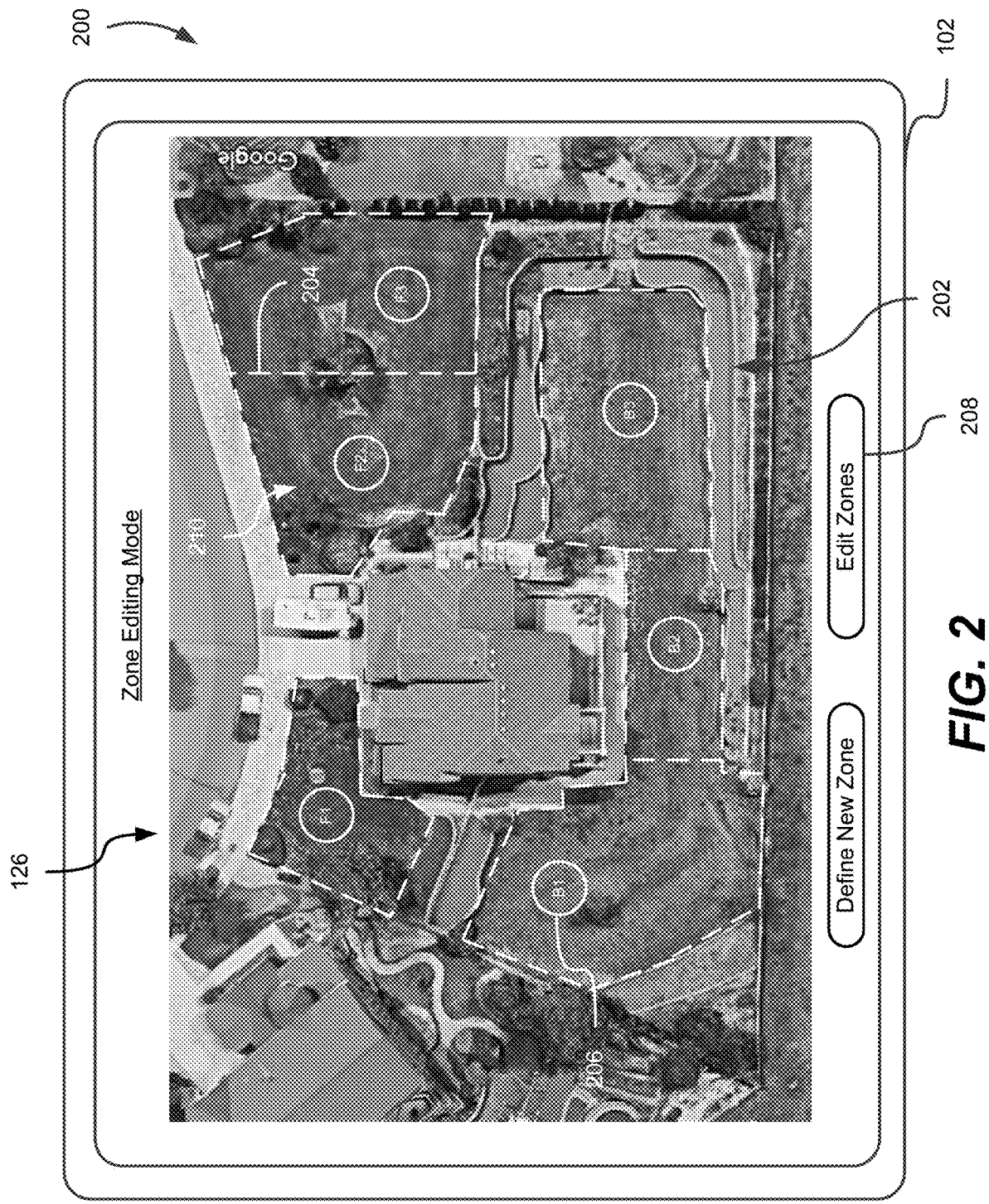
FIG. 2 is a first screen of a user interface of a device in the environment of FIG. 1.

FIG. 2 shows a user interface screen 200 of a graphical user according to one or more embodiments. As shown, the user interface screen 200 may be presented on a display of the mobile device 102 as a result of execution of the set of instructions 104. The user interface screen 200 presents the region image 126 representing an overhead view of the defined geographic region 202 to a user of the mobile device 102 by, for example, interacting with one or more of the interface elements 124. The region image 126 may be obtained by the network device 106 and provided to the mobile device 102. The mobile device 102 may, in response to user interaction, send location information indicating a location of the defined geographic region 202—for instance, latitude and longitude coordinates of the defined geographic region 202 obtained using a global positioning system receiver of the mobile device 102. The network device 106 may send a request to the server 108 to obtain the region image 126 corresponding to the defined geographic region 202 and receive, in response to the request, the region image 126 from the server 108, which is displayed by the mobile device 102.

The user interface screen 200 depicts a "zone editing mode" in which the user may define a set of zones respectively corresponding to portions of the defined geographic region 202 for which the user wishes to monitor and/or control water usage. In particular, the user may interact with the user interface screen 200 to define or edit one or more zones 210 within the region image 126. The user may interact with interface elements of the user interface to position shapes or lines 204 overlaying the region image 126 to partition or allocate the region image 126 into a plurality of the zones 210 that each correspond to a subregion of the defined geographic region 202. Via the user interface the user may assign an identifier 206 to each region for which they wish to monitor and/or control water usage. Such identifiers 206 may be assigned, for example, to areas corresponding to grass or other vegetation. On the other hand, the user may not assign an identifier to some regions on the basis that those regions correspond to a structure or concrete that does not need to be watered.

The region image 126 may be obtained from an online map repository storing a database of overhead images of properties. Examples of such map repositories include Google® maps, Microsoft Bing®, Mapbox, and MapQuest®, by way of non-limiting example. The set of instructions 104 (e.g., application) executing on the processor(s) of the mobile device 102 may include instructions for obtaining map data from the map repository via middleware, such as an application programming interface (API). The user may interact with the user interface screen 200 to cause the mobile device 102 to obtain the desired region image 126, e.g., by navigating the user interface screen 200 to display the region image 126 corresponding to the defined geographic region 202. As a result of selecting the region image 126 from the displayed map data in the user interface screen 200, the mobile device 102 may send a communication to the server (e.g., via the network device 106, over the network 114) instructing the server 108 to associate the region image 126 and the corresponding location (e.g., address) in the map data with an account of the user.

Thereafter, the user may allocate or partition portions of the region image 126 into a plurality of zones 210 that correspond to subregions of the defined geographic region 202. For instance, the user may interact with one or more interface elements 208 to enable controls for defining new zones in the region image 126 or editing existing zones in the region image 126. The interface controls may enable the user to position the shapes or lines 204 at locations within the region image 126 to define the plurality of zones 210. The mobile device 102 may generate information corresponding to the region image 126 and the plurality of zones 210, which may be stored in memory of the mobile device 102 and/or sent to the network device 106 or server 108 for storage. The information regarding the partitioning may be a data structure or data object including identifiers for each of the zones and information identifying a shape and location of each zone relative to the region image 126.

Figure 3:
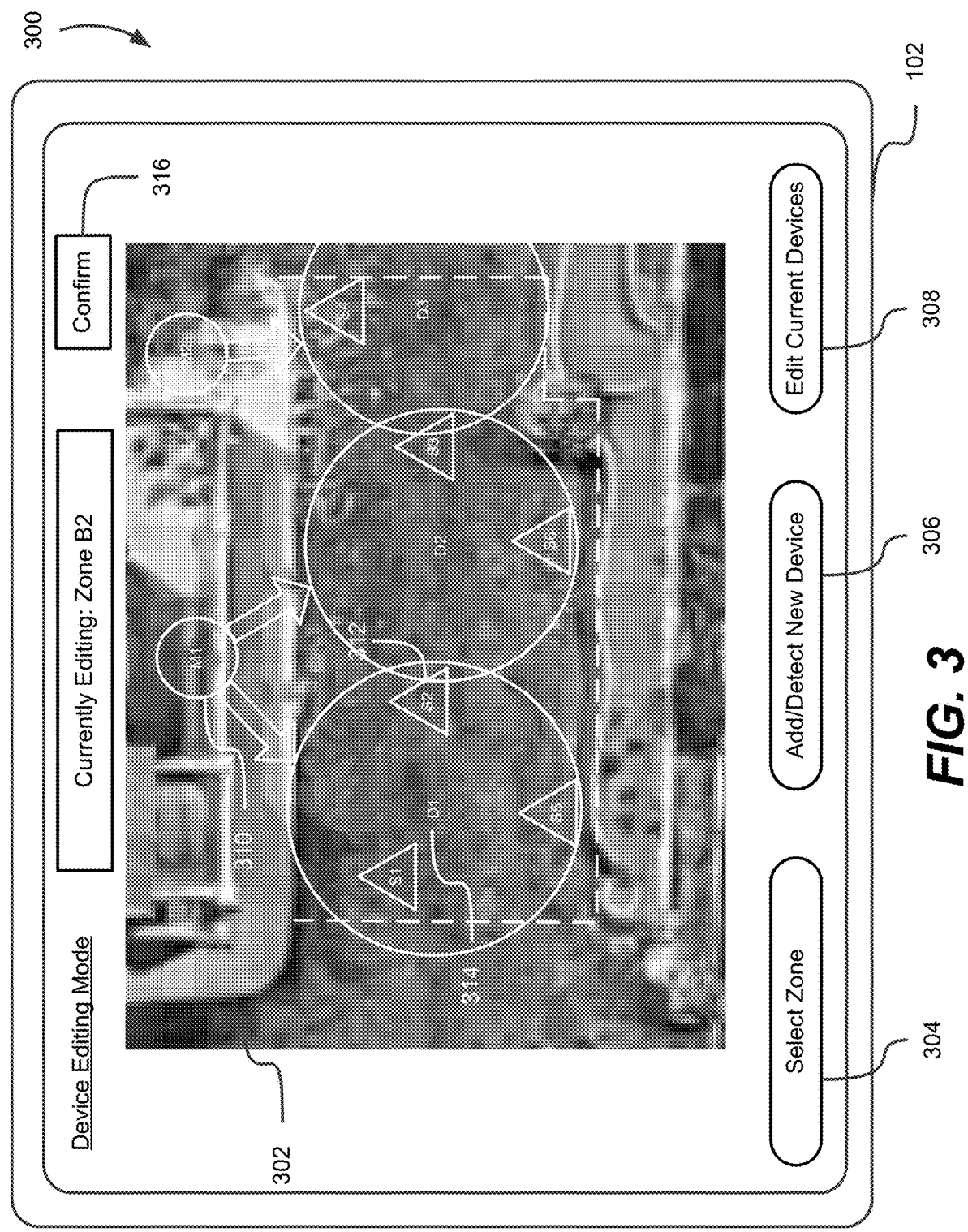
FIG. 3 is a second screen of a user interface of a device in the environment of FIG. 1.

FIG. 3 shows a user interface screen 300 of the graphical user interface according to one or more embodiments. As shown, the user interface screen 300 may be presented on a display of the mobile device 102 as a result of execution of the set of instructions 104. The user interface screen 300 presents an image 302 representing at least a portion of the region image 126. In this particular example, the image 302 represents a zone "B2" of the region image 126. In some embodiments, the image 302 may represent some or all of the plurality of zones 210 of the region image 126.

The user interface screen 300 enables the user to establish locations of devices within respective zones of the plurality of zones 210. For instance, the user interface screen 300 includes an interface element 304 for selecting a particular zone; a user interface element 306 for adding or detecting new devices (e.g., moisture sensors 112, water flow measurement devices 118, water distribution devices 120); and a user interface element 308 for editing positions of devices within a zone.

The user interface screen 300 also includes icons representative of positions of devices within a zone. The user interface screen 300 may include first icons 310 respectively representative of positions of water flow measurement devices 118, may include second icons 312 respectively representative of positions of moisture sensors 112, and may include third icons 314 respectively representative of positions of water distribution devices 120. The first icons 310 may indicate, e.g., via an arrow or other such link, to which water distribution devices 120 the corresponding flow measurement device 118 is connected to supply water. The third icons 314 may have a size and shape representative of an area of the zone to which the corresponding water distribution devices 120 will distribute water. For instance, standard rotational sprinklers may have associated icons that are circular in shape to illustrate a water distribution pattern thereof.

To position a device location in the zone, the user may select the interface element 306 to add a new device or select the interface element 308 to edit the position of a previously positioned device. The user may select a type of device to add and scan for identification information of devices that are in a positioning mode. For instance, the moisture sensors 112 may include a button that causes the moisture sensor 112 to emit identification information and an indication that the user is positioning the device in a zone. The mobile device 102 may obtain information regarding a current location of the mobile device 102 via a global positioning satellite receiver of the mobile device 102. Based on the current location information, the set of instructions 104 may cause the mobile device 102 to present an icon suggesting a location of the device within the zone on the interface portion 300. The user may then accept the suggested position or further revise the position of the icon within the display of the mobile device 102 to reflect the actual position of the device in the defined geographic region 202. After the user has positioned all the icons representative of the locations of the devices in the zone, the user may select an interface element 316 confirming the positioning and/or type of devices shown in the interface portion 300.

Figure 4:
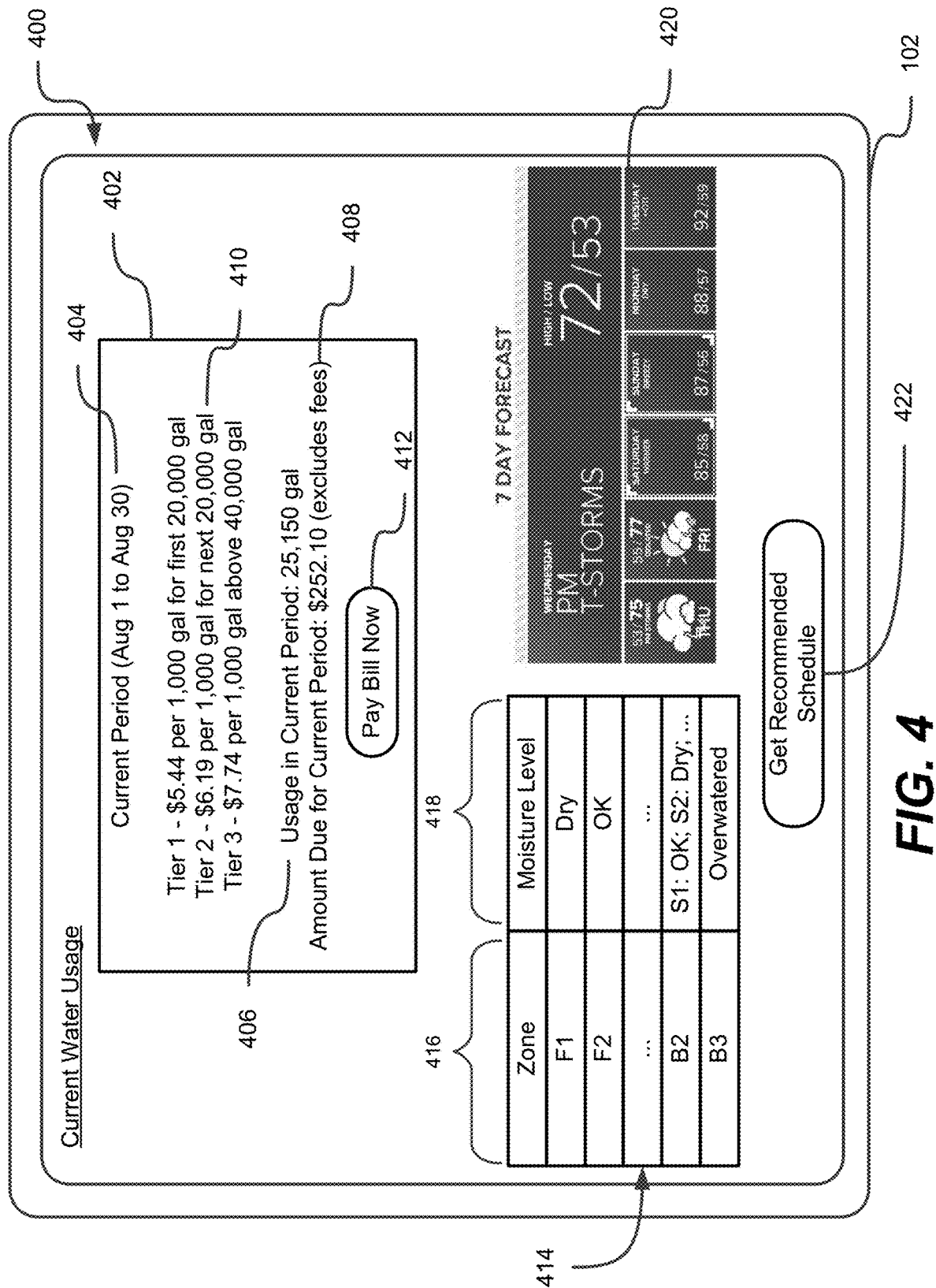
FIG. 4 is a third screen of a user interface of a device in the environment of FIG. 1.

FIG. 4 shows a user interface screen 400 of the graphical user interface 122 according to one or more embodiments. As shown, the user interface screen 400 may be presented on a display of the mobile device 102 as a result of execution of the set of instructions 104. The user interface screen 400 provides information regarding current water usage in the defined geographic region 202 to help the user determine whether to water all or certain areas of the defined geographic region 202, or whether to adjust a schedule for watering the defined geographic region 202 at a future time. The user interface screen 400 may be accessible via user interaction with a corresponding interface element 124 of the user interface 122 described herein.

The user interface screen 400 includes a portion 402 providing information regarding current water usage in the defined geographic region 202. The portion 402, for example, includes time period information 404 indicating a current time period, current usage information 406 indicating a total amount of water usage in the current time period, amount due information 408 indicating a monetary amount due for the total amount of water usage, as well as cost information 410 regarding cost per usage for different ranges. As a result of interaction with a corresponding interface element 124, the set of instructions 104 may send a request to obtain some or all of the information in the portion 402. The server 108 may receive the request and obtain the desired information from the appropriate municipal water utility and provide the information to the mobile device 102 via the network 114. The portion 402 may further include a user interface element 412 that the user may interact with to pay a bill. User account information (e.g., account number, user name, password) may be securely stored in memory of the mobile device 102 in association with the set of instructions 104 to facilitate acquisition of the information in the portion 402, bill payment, and other relevant information and operations.

The portion 402 may also include moisture information 414 regarding moisture levels measured by the moisture sensors 112. The moisture information 414 may indicate zones 416 and corresponding moisture levels 418 for the respective zones. For example, the moisture information 414 indicates that the moisture level for the zone "F1" is "Dry." The moisture levels 418 may be an average or aggregated moisture level for the respective zones 416. In some embodiments, the moisture levels 418 may specify measurements from respective moisture sensors 112. The moisture information 414 indicates that, for the zone B2 depicted in FIG. 2, the moisture level detected by sensor S1 is acceptable whereas the moisture level detected by sensor S2 is too dry. In some embodiments, the zones 416 may instead correspond to particular sensors and the moisture levels 418 may be specific to the particular sensors. The moisture levels 418 depicted are descriptive of a state of the soil (e.g., "dry," "OK"), but may include other indications representative of the state of the soil measured such as a number, color, or emoji, by way of non-limiting example.

The portion 402 may also indicate weather information 420 displaying current and forecasted weather and meteorological conditions to assist the user in making decisions for water usage. The weather information 420 may indicate current temperature and conditions, high and low temperatures for the current day, forecasted conditions for the day, or forecasted temperatures and conditions for time periods in the future. The server 108 may obtain the weather information 420 from a server of a weather authority, such as the National Oceanic and Atmospheric Administration (NOAA), in response to a request by the mobile device 102 or the network device 106 to obtain the information for a locale corresponding to the defined geographic region 202.

The portion 402 may include one or more user interface elements for managing or monitoring water usage. For example, the portion 402 shown in FIG. 4 includes a user interface element 422 for obtaining a recommended water usage schedule based on the current water usage information. The interface element 422 may cause the mobile device 102 to send a request to the network device 106 to generate scheduling information regarding a recommended water usage schedule for the defined geographic region 202 based on a set of factors. The set of factors may include one or more of current detected moisture levels 418, the weather information 420, cumulative water usage for a current time period (e.g., current usage information 406), the cost information 410, and an efficiency model of the defined geographic region 202.

The network device 106 and/or the server 108 may generate the schedule information which is provided to the mobile device 102 in response to the request. The schedule information may indicate zones and areas in the zones (e.g., moisture sensor 112 locations) to be watered, times and dates suggested for watering the respective zones and areas in the zones, and lengths of time that the zones and/or areas should be watered. The schedule information may even suggest locations at which to place sprinklers. In some embodiments, the schedule information may include or have associated therewith control information for causing particular water distribution elements 124 to start and stop provisioning water at particular times and dates.

Figure 5:
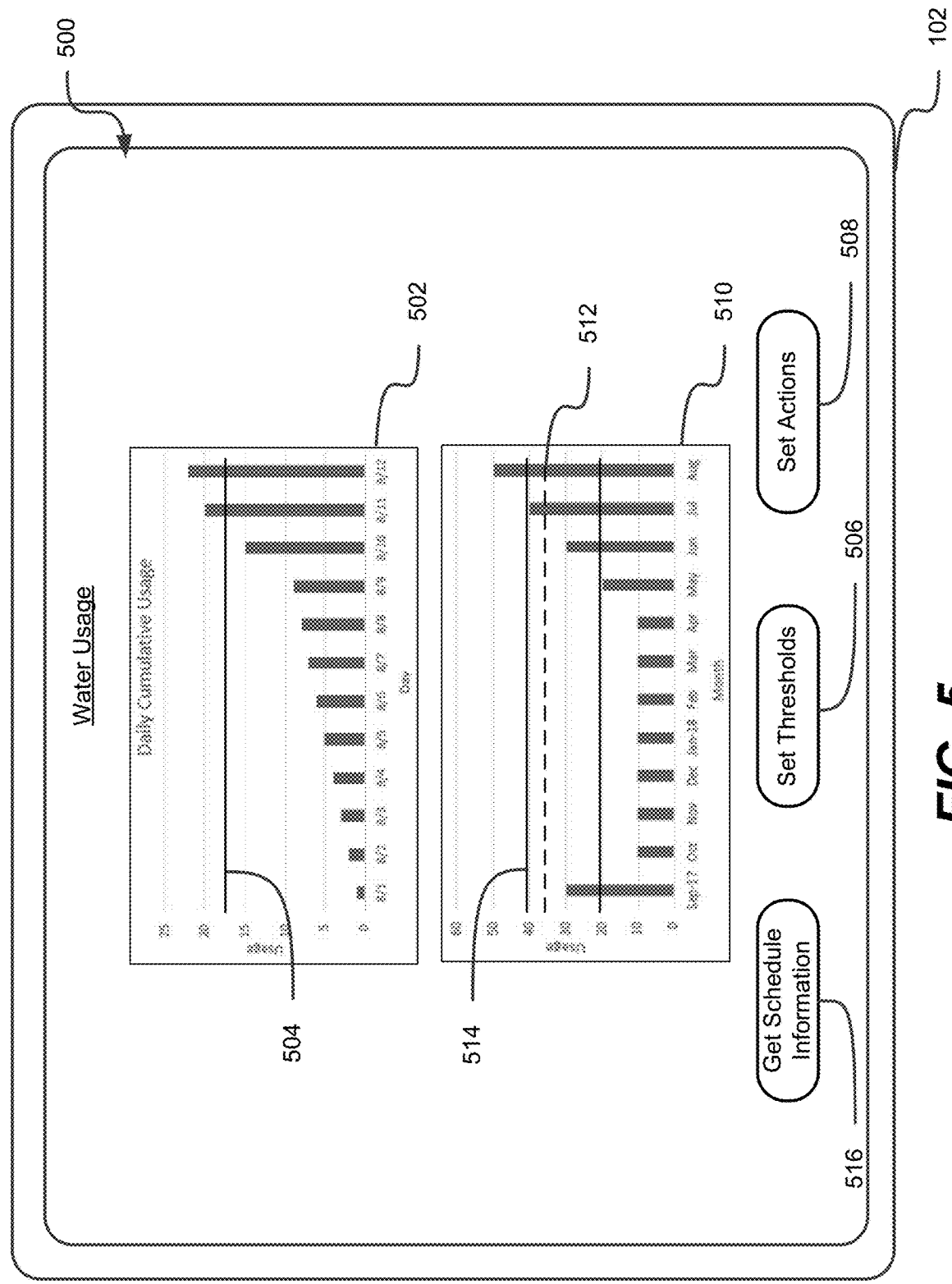
FIG. 5 is a fourth screen of a user interface of a device in the environment of FIG. 1.

FIG. 5 shows a user interface screen 500 of the graphical user interface according to one or more embodiments. As shown, the user interface screen 500 may be presented on a display of the mobile device 102 as a result of execution of the set of instructions 104. The user interface screen 500 provides information regarding current and historical water usage. The user interface screen 500 may be accessible via user interaction with a corresponding interface element 124 of the user interface 122 described herein.

The user interface screen 500 includes a current use portion 502 providing information indicating cumulative water usage for a current time period. For instance, for a current billing period, the cumulative water usage indicates amounts of water used for each day, each week, or other periods of time in the current billing period. The current use portion 502 may also include a threshold 504 indicating a water usage level that, if the cumulative water usage exceeds, cause one or more actions to be performed by the network device 106, the mobile device 102, and/or the server 108. In some embodiments, the threshold 504 may be a user defined water usage threshold that the user can adjust as a result of interacting with a user interface element 506.

Non-limiting examples of the various actions that can be performed include causing a notification to be presented in the user interface 122 or provided to another destination and adjusting or recommending adjustments to the scheduling information to moderate water usage. The user may set the desired actions that are to be performed in response to exceeding the threshold(s) 504 by interacting with a user interface element 508. As a result of interacting with the interface element 508, the user may associate specific actions to be performed in response to certain thresholds 504 being exceeded—for example, transitioning to a reduced usage schedule in which less water is applied to certain portions of the defined geographic region 202.

The user interface screen 500 may also include a historical use portion 510 providing information indicating historical water usage over one or more previous time periods relative to a current time period. The historical use portion 510 may include other information, such as an average usage indication 512 of an average of mean water usage amount for the one or more previous time periods. The historical user portion 510 may also include cost thresholds 514 that indicate water usage levels at which the cost of water usage changes. The interface screen 500 may also include a user interface element 516 that a user can interact with to obtain scheduling information for previous time periods—for instance, a water usage schedule for a period that was lower than the average usage indication 512 or a water usage schedule for a period that did not exceed a certain threshold 514.

Figure 6:
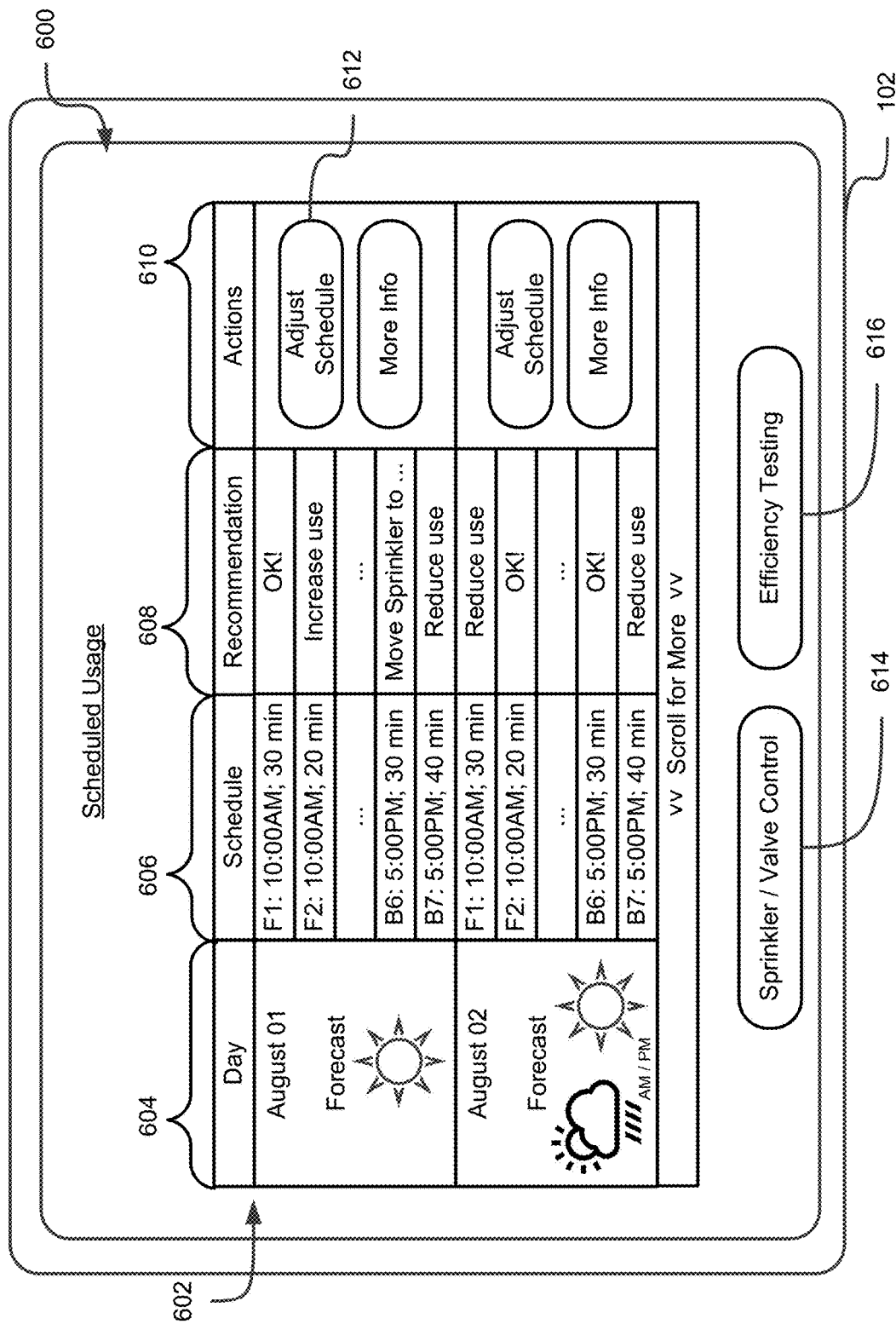
FIG. 6 is a fifth screen of a user interface of a device in the environment of FIG. 1.

FIG. 6 shows a user interface screen 600 of the graphical user interface 122 according to one or more embodiments. As shown, the user interface screen 600 may be presented on a display of the mobile device 102 as a result of execution of the set of instructions 104. The user interface screen 600 presents scheduling information regarding a schedule for water usage in the defined geographic region 202. The user interface screen 600 may be accessible via user interaction with a corresponding interface element 124 of the user interface 122 described herein.

The user interface screen 600 includes a schedule 602 indicating dates and times at which zones and/or portions of zones are to be watered according to one or more embodiments. The schedule 602 may be provided by the mobile device 102 based on schedule information received from the network device 106 and/or the server 108. The schedule 602 may include dates 604 and scheduled water usage 606 indicating the times that zones and/or portions thereof are to be watered. In some embodiments, the scheduled water usage 606 may be generated by the network device 106 or the server 108 based on an efficiency model of the defined geographic region 202, as described herein. The scheduled water usage 606 may be generated based on other factors as well, such as current and forecasted weather conditions, moisture levels detected by the set of moisture sensors 112, previous water usage, and cost information, by way of non-limiting example.

The scheduled water usage 606 may specify, for a given area (e.g., zone, moisture sensor 112) and for each day, one or more times at which water is scheduled to be applied to the given area and a duration for which the water is scheduled to be applied to the given area. In some embodiments, the scheduled water usage 606 may specify an amount of water to be applied to each given area beginning at a certain time or within a window of time. In some embodiments, the user may enter or confirm the scheduled water usage 606 via the user interface 122 based on a recommended schedule provided by the network device 106 and/or the server 108.

In some embodiments, the network device 106 may store in memory control information corresponding to the scheduled water usage 606 for controlling one or more water distribution devices 120 according to the schedule information. For example, the network device 106 may store control information that causes one or more processors of the network device 106 to send a communication at a time specified in the control information to a valve associated with a particular zone causing the valve to permit the flow of water to one or more sprinklers in the zone. After a period of time specified in the control information, the network device 106 may then send another communication instructing the valve to stop distribution of water.

In some implementations, some or all of the water distribution devices 120 may not be remotely controlled by the network device 106. In such implementations, the network device 106 and/or the server 108 may send a communication to the mobile device 102 causing a notification to be presented by the mobile device 102 indicating that a zone or portion thereof should be watered. In some embodiments, the information regarding the scheduled water usage 606 may be stored in the memory of the mobile device 102 and cause the mobile device 102 to present a notification indicating that a particular zone or portion thereof is scheduled to be watered.

The schedule 602 may also include recommendations 608 generated by the network device 106 or the server 108 recommending modifications to the scheduled water usage 606 based on a variety of factors. The recommendations 608 may be regarding suggested adjustments to the scheduled water usage 606. The recommendations 608 may include suggestions to increase or decrease water application within a zone or portion thereof, or suggestions regarding placement locations of sprinklers and/or moisture sensors 112. The recommendations 608 may be based on weather forecasts, updates to the efficiency model for the defined geographic region 202, changes in water usage cost, or other factors. The user may adopt some or all of the recommendations via interaction with user interface elements on the interface screen 600.

The user interface screen 600 may also include actions 610 that the system (e.g., mobile device 102, network device 106, server 108) can perform in connection with information provided in the schedule 602. The actions 610 may include a user interface element 612 for adjusting the scheduled water usage 606 by, for instance, adjusting a duration, time, or day for which a zone or portion thereof is watered.

The interface screen 600 may include other user interface elements for performing other actions. In some embodiments, a user interface element 614 may be provided for remotely controlling one or more water distribution elements 120 to irrigate the defined geographic region 202. As one example, in an implementation where a valve is remotely controllable, a user may interact with the interface element 614 to cause the network device 106 to send a communication to the valve causing the valve to permit the flow of water to a set of sprinklers at the present time or a particular time in the future. The interface screen 600 may include an interface element 616 for performing efficiency testing for the defined geographic region 202. The user may interact with the interface element 616 to cause the network device 106 to obtain a plurality of soil moisture measurements from at least some of the set of moisture sensors 112 to update or generate an efficiency model for the defined geographic region 202. Efficiency testing may include automatically or manually applying water to the defined geographic region between successive measurements of the plurality of soil moisture measurements.

Figure 7:
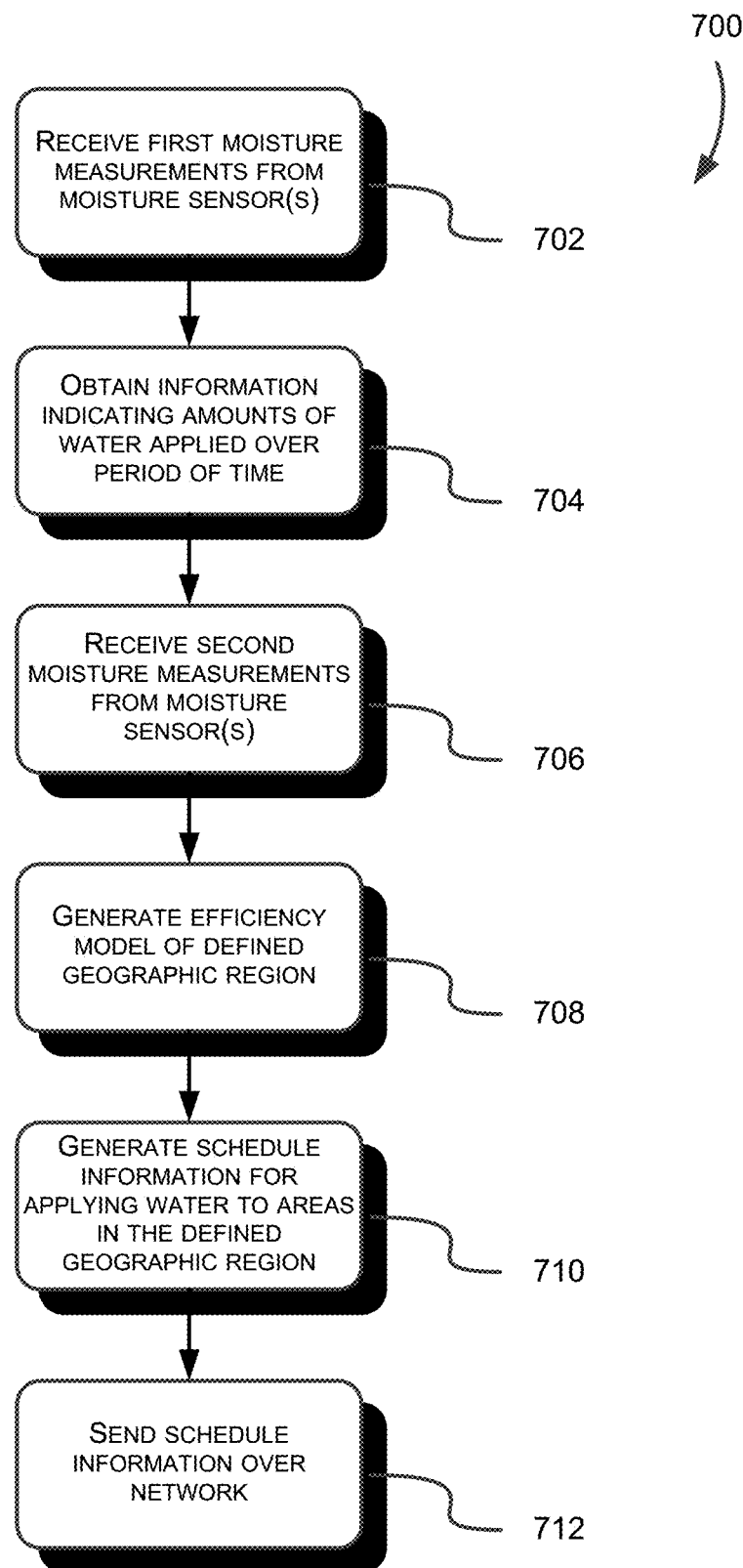
FIG. 7 is a method for obtaining schedule information for applying water to the defined geographic region.

FIG. 7 shows a method 700 of generating schedule information for application of water to a defined geographic region. The method 700 may be performed by one or more systems of the environment 100. In some embodiments, the method 700 may be performed by the network device 106. In some embodiments, the method 700 may be performed by the server 108. The method 700 may be performed in connection with operations by the mobile device 102—for example, in response to receiving communications initiated by the mobile device 102. The method 700 is not intended to include all operations performed by systems in the environment 100 and, as such, may include additional operations not described or depicted in the method 700 (or in the associated methods described herein). In some instances, some operations described in the method 700 (or the associated methods described herein) may be omitted without departing from the scope of the present disclosure. Some or all of the operations described with respect to the method 700 may be initiated in response to communications sent by the mobile device 102, such as by interacting with the user interface 122.

The method 700 includes receiving 702 a set of first moisture measurements from the set of moisture sensors 112 at a first time. Receiving 702, in some embodiments, may include the network device 106 sending a request to all or specific ones of the set of moisture sensors 112 and receiving, in response to the request, the set of first moisture measurements. In some embodiments, the set of moisture sensors 112 may periodically provide moisture measurements to the network device 106. The first moisture measurements are received as wireless communications that include information indicating a moisture level or content of soil as detected by individual ones of the set of moisture sensors 112. The first moisture measurements may include or have associated therewith additional information, such as a sensor identifier identifying each sensor, or environmental conditions detected by the moisture sensor 112 (e.g., temperature, ambient light level, humidity). Receiving 702 the set of first moisture measurements may be part of operations for generating an efficiency model of the defined geographic region 202—for example, in response to user interaction with the interface element 616.

The method 700 also includes obtaining 704 information that indicates an amount of water applied to zones (or portions thereof) in the defined geographic region 202 over a first period of time after the first time. Obtaining 704 the information indicating the amount of water applied may include obtaining a first reading from a water meter or water flow measurement device 118 regarding an amount of water usage. Then, water is applied to the defined geographic region 202 for a given period of time or until the water flow measurement device 118 indicates that a certain amount of water is applied.

In some embodiments where the water distribution devices 120 are remotely controlled, obtaining 704 the information may include controlling, by the network device 106, the water distribution devices 120 to apply water to one or more zones in the defined geographic region 202 for a given period of time or until the water distribution device(s) 120 indicate that a certain amount of water has been applied. The water distribution device(s) 120 may then to cause the water distribution device(s) 120 to stop provisioning water to the defined geographic region. The network device 106 may then obtain a second reading from the water flow measurement device(s) 106 and determine an amount of water applied over the given period of time based on a difference between the first reading and the second reading. This may be repeated for each zone and/or water flow measurement device 118 associated with the defined geographic region.

In some embodiments, obtaining 704 the information may be performed in a process by which the user enters the information in prompts and instructions on the user interface 122. In some embodiments, the information regarding amount of water flow may be obtained from a municipal water utility service or a device provided thereby. For example, the water flow measurement device 118 may be a device installed by a municipal water utility service that can communicate with the municipal water service and/or interface with devices on the LAN 116.

The method 700 further includes receiving 706 a set of second moisture measurements from the set of moisture sensors 112 at a second time after the first period of time. The set of second moisture measurements may be received 706 in a manner substantially similar to receiving 702 the set of first moisture measurements, so further discussion thereof is omitted. The set of second moisture measurements are obtained at a time shortly after the application of the amount of water to the location of the moisture sensor obtaining the moisture measurements. For example, the second moisture measurement for a given moisture sensor may be taken within 5 minutes after application of the amount of water to the location of the soil in which the moisture sensor is positioned.

The method 700 also includes generating 708 an efficiency model of the defined geographic region 202 based on the set of first moisture measurements, the set of second moisture measurements, and the information indicating amounts of water applied over the first period of time. The efficiency model is a data structure representative of a response of soil at various locations in the defined geographic region 202 to the application of amounts of water. The efficiency model may include, for each location, an array of numeric values representative of an efficiency of the soil to absorb water. Each of the set of numeric values may be associated with information indicating environmental and circumstantial conditions at the time the efficiency measurements were obtained. Non-limiting examples of such environmental conditions may include a time of day, a time of year (e.g., month, season), temperature, humidity, ambient light level, and weather conditions.

The efficiency model may indicate that certain areas of the defined geographic region need less water than other areas. The efficiency model may also indicate that some areas may need less water based on current environmental and circumstantial conditions. For example, some areas of a yard may receive more direct sunlight in a day during some portions of the year than at others; accordingly, the efficiency of such areas may be less during those periods of longer sun than at others. Other factors and conditions may similarly affect the efficiency for different zones or areas of the defined geographic region 202.

The method 700 includes generating 710 schedule information indicating future periods of time at which water is to be applied to areas in the defined geographic region 202 based on the efficiency model. The schedule information may be generated by any appropriate system of the environment 100, such as the network device 106 or the server 108. The schedule information may include at least some of the information depicted described with respect to the schedule 602 of FIG. 6 and elsewhere herein. The schedule information may specify portions of the defined geographic region to be watered and, for each portion, times and durations for watering. In some embodiments, the schedule information includes control information for causing particular water distribution devices 120 to apply water to the portions of the defined geographic region at the times and for the duration specified.

A problem experienced in connection with irrigation is that some areas retain or absorb water differently and so it can be difficult to account for such differences in efficiency of the soil. Some areas of a lawn, for example, may have different characteristics than others that affect how they retain or absorb water, such as different soil properties, different drainage properties, different exposure to sunlight, and so forth. The schedule information generated based on the efficiency model helps to address the foregoing issues regarding differences in efficiency at different locations of a defined geographic region by providing guidance on how to appropriately water the lawn and reduce the likelihood of over or under watering.

In some embodiments, a plurality of efficiency models may be generated by performing the operations 702, 704, 706 one or more additional times. Each of the efficiency models may correspond to a different set of factors or conditions present at the time the moisture measurements are made. In such embodiments, generating scheduling information based on a particular efficiency model that most closely resembles or matches current conditions. This helps to provide a schedule for water usage that is appropriate to environmental conditions and other considerations present at the current time.

At 712 of the method 700, the schedule information is sent over a network to one or more other devices. In some embodiments, the server 108 may send the schedule information to the network device 106 and/or mobile device 102. In some embodiments, the network device 106 may send the schedule information to the mobile device 102. The network device 106 may also send communications to one or more water distribution devices 120 to distribute or apply water to the specified portions of the defined geographic region 202.

Figure 8:
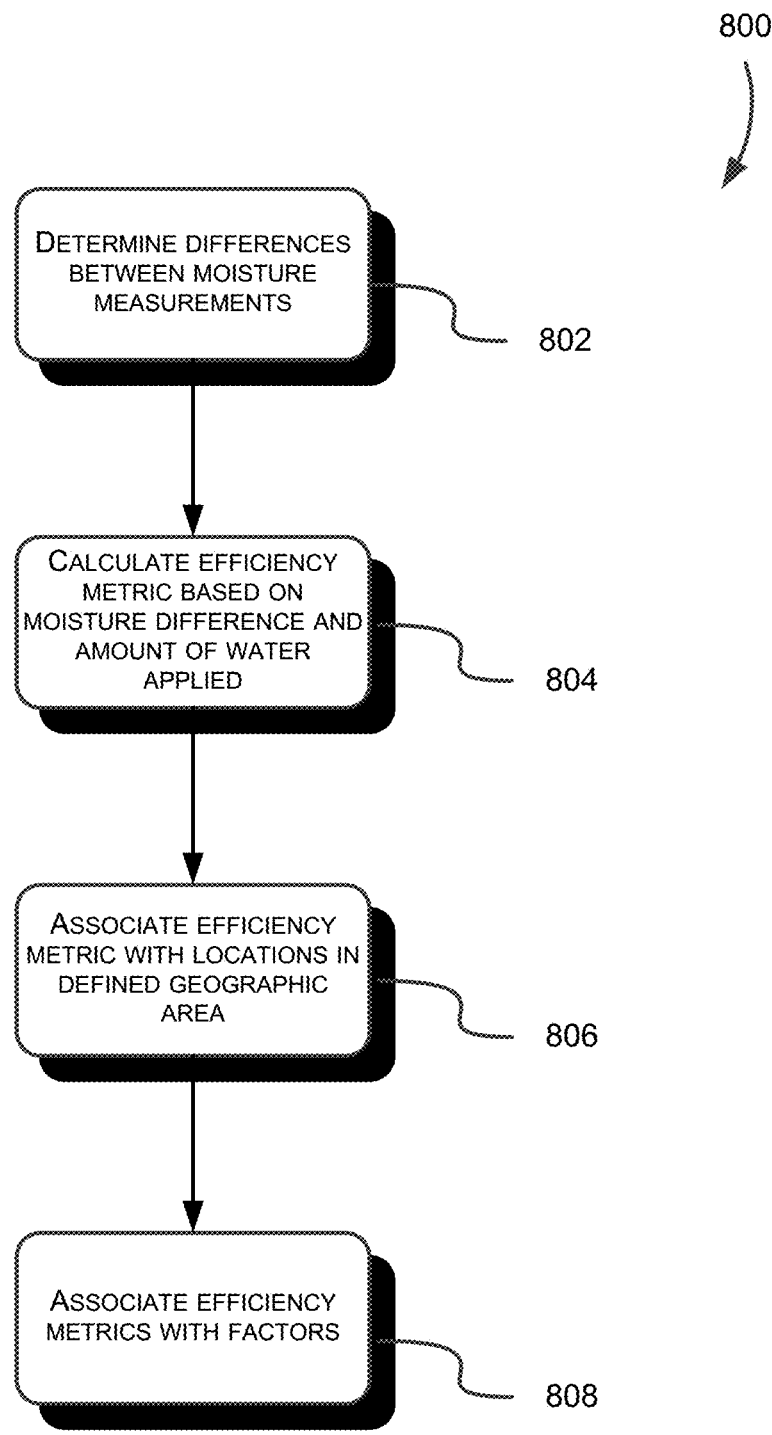
FIG. 8 is a method for generating an efficiency model of the defined geographic region.

FIG. 8 shows a method 800 for generating an efficiency model according to one or more embodiments. The method 800 may be performed as part of or in association with generating 708 the efficiency model of the defined geographic region 202 of the method 700. The method 800 may be performed by one or more systems of the environment 100, as described above with respect to the method 700. The method 800 is not intended to include all operations performed by systems in the environment 100 and, as such, may include additional operations not described or depicted in the method 800. Some or all of the operations described with respect to the method 800 may be initiated in response to communications sent by the mobile device 102, such as by interacting with the user interface 122.

The method 800 includes determining 802 differences between the moisture measurements received. In particular, for each of the set of moisture sensors 112 for which moisture measurements are obtained (i.e., in 702 and 706 of the method 700), a difference is determined between corresponding measurements of the set of second moisture measurements and the set of first moisture measurements. The difference may be determined as a numerical value representing a difference in moisture content in a given location in the soil at different times before and after application of a given amount of water. This moisture difference indicates an amount of water that is absorbed into a depth of the soil at which the moisture sensor is detecting moisture content.

The method 800 proceeds by calculating 804, for each of the set of moisture sensors 112, efficiency metrics for locations of the defined geographic region 202. Each of the efficiency metrics may correspond to a location of a corresponding one of the set of moisture sensors 112. The efficiency metric provides a numerical value particular to a soil location that represents a characteristic of the soil and associated environmental factors to absorb and retain moisture as a result of application of a given amount of water. The efficiency metric may be obtained by dividing, for each moisture sensor, the moisture difference determined in 802 by an amount of water applied to the defined geographic region 202 or a portion thereof in 704 of the method 700. For instance, a difference in measured moisture detected by a moisture sensor S1 in FIG. 3 may be divided by an amount of water detected by a water flow measurement device 118 associated with the moisture sensor S1 between the moisture measurements by the moisture sensor S1. Other amounts of water may be used to determine this efficiency metric, such as an amount of water applied to an entire zone in which the moisture sensor is located or an amount of water applied to the defined geographic region 202 as a whole.

Next, the method 800 involves associating 806 the calculated efficiency metrics with corresponding locations in the defined geographic region. In particular, the system (e.g., network device 106, server 108) obtains the region image 126 of the defined geographic region 202 and determines a location of each of the set of moisture sensors 112 in the region image 126 according to a method discussed below with respect to FIG. 9 and elsewhere herein. A data structure associating the location determined for each sensor with a sensor identifier particular to the sensor among the set of moisture sensors 112. Respective efficiency metrics calculated in 804 are associated in memory (e.g., with the data structure) with the corresponding moisture sensor of the set of moisture sensors 112. As a result, individual moisture sensors of the set of moisture sensors 112 has information associated therewith regarding a portion of the defined geographic region 202 in which each individual moisture sensor is located.

In some embodiments, the data structure may be a one-dimensional array having elements corresponding to respective ones of the set of moisture sensors 112. Each element of the array may be referenced to one or more corresponding memory locations storing location information, efficiency metrics, and other information associated with the respective moisture sensors 112. In some embodiments, the data structure may be a two-dimensional array having a first dimension storing identifiers for the respective ones of the moisture sensors 112 and a second dimension storing information associated with the respective moisture sensors (e.g., location, efficiency metric).

At 808, each efficiency metric for locations in the defined geographic region 202 may be associated with one or more environmental conditions or other factors that may affect the ability of soil to absorb or retain water. One factor may be a temperature associated with the defined geographic region 202 over a time period in which the moisture measurements were performed. High temperatures may cause water to evaporate more quickly than more moderate temperatures, thus affecting the efficiency determined for locations in the defined geographic region 202. The temperature may be measured by one or more of the set of moisture sensors 112, provided as input by a user, or obtained from a weather or meteorological authority (e.g., National Oceanic and Atmospheric Administration, Accuweather®). Another factor may be ambient light level detected by the set of moisture sensors 112 when the moisture measurements were obtained. Yet another factor may be weather conditions at the time the moisture measurements were obtained. Such weather conditions may be obtained from a recognized meteorological or weather authority, or provided as input to the user interface 122 by the user. Other factors include wind, humidity, time of day, time of year (e.g., month, season), and amounts of recent precipitation (e.g., within last 2 days), by way of non-limiting example.

The efficiency metrics for each of the set of moisture sensors 112 may be associated with one or more factors described above that may affect the ability of soil to absorb or retain water. In some instances, the same information regarding a factor, such as time of day, may be stored in association with a set of efficiency metrics for the defined geographic region 202. In some instances, different information, such as detected ambient light level, may be stored in association with efficiency metrics for corresponding moisture sensors. Thus, a plurality of efficiency models may be generated each corresponding to a different factor or set of factors. Efficiency models for the defined geographic region 202 may be applied having factors that match or most closely resemble current conditions for the factor or set of factors. Efficiency models may be updated or added occasionally to account for efficiencies under different conditions.

Figure 9:
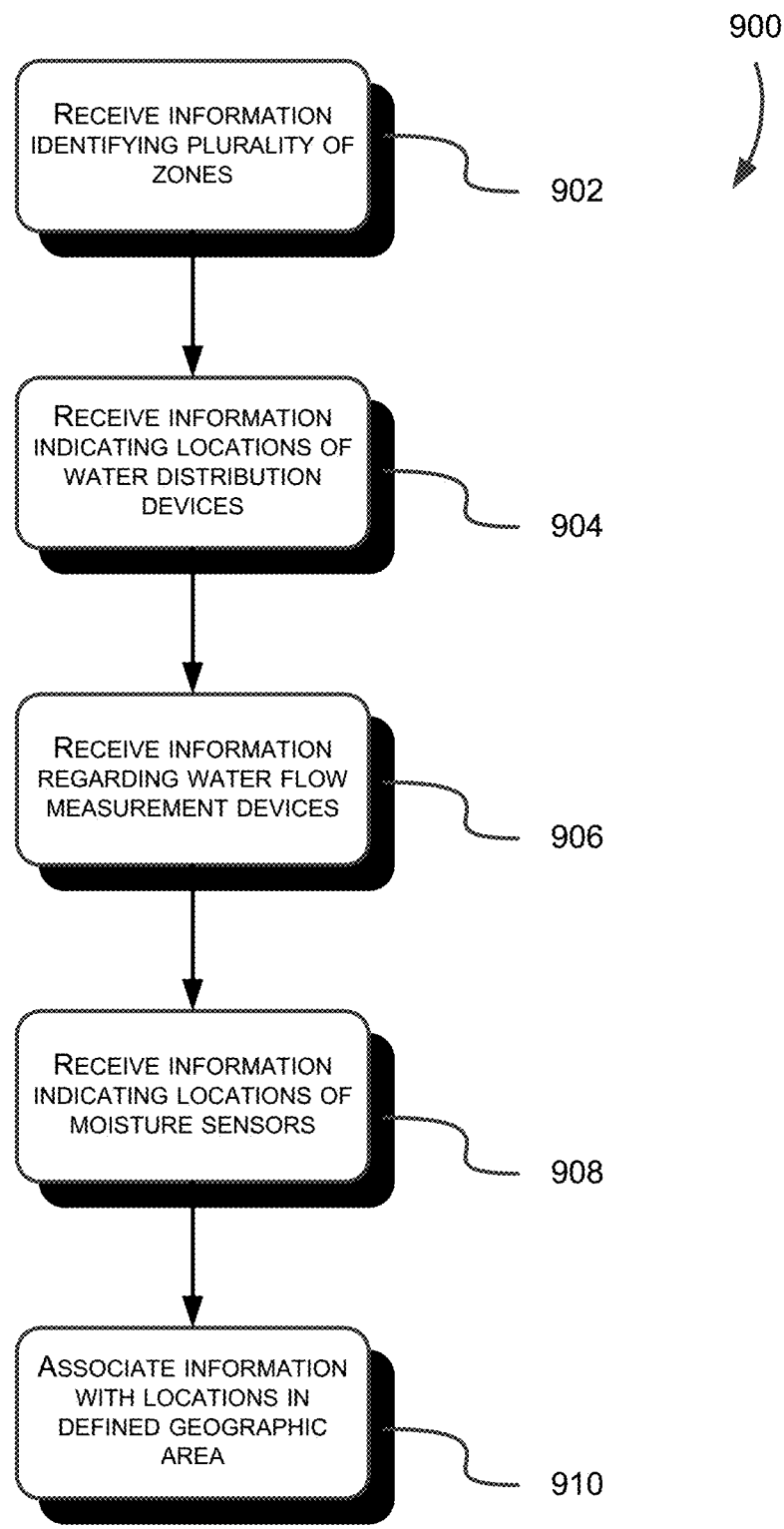
FIG. 9 is a method for registering devices and systems of the environment of FIG. 1.

FIG. 9 shows a method 900 for registering devices and systems in the environment 100 according to one or more embodiments. The method 900 may be performed as part of or before the method 700. The method 900 may be performed by one or more systems of the environment 100, such as the network device 106 or the server 108. The method 900 is not intended to include all operations performed by systems in the environment 100 and, as such, may include additional operations not described or depicted in the method 900 or may omit some operations thereof. Some or all of the operations described with respect to the method 900 may be initiated in response to communications sent by the mobile device 102, such as by interacting with the user interface 122.

The method 900 includes receiving 902 information identifying a plurality of zones 210 in the defined geographic region 202. The user may interact with the user interface screen 200 to define or edit a plurality of zones 210 in the defined geographic region 202 by, for example, positioning lines and/or shapes 204 defining the zones. Then, in response to a user input, the mobile device 102 may send a communication to the network device 106 and/or the server 108 including information representative of the shapes, dimensions, and locations of zones defined by the user in the region image 126. The network device 106 or the server 108 may obtain the region image 126 and identify the shapes, dimensions, and locations of the zones in the region image 126 based on the communication received. The information may be sent by the mobile device 102 and received in 902 by the network device 106 and/or the server 108.

Next, the method 900 may include receiving 904 information originating from the mobile device 102 indicating locations of the water distribution devices 120 in the defined geographic region 202. In some instances, the information indicating the locations may be in latitudinal/longitudinal format—for instance, the user may position a water distribution device 120 and interact with the user interface screen 300 to cause the mobile device 102 to generate location information (e.g., via a global positioning system receiver) representing a position of the water distribution device 120 placed. In some instances, the information indicating the locations may be in the form of coordinates of a location in the region image 126 itself—for instance, the user may interact with the user interface screen 300 to place a third icon 310 in a location of the region image 126 corresponding to the placed water distribution device 120. The information received in 904 may also include or have associated therewith information identifying the water distribution device(s) 120 placed. The information may be sent by the mobile device 102 and received in 904 by the network device 106 and/or the server 108.

The method 900 may further include receiving 906 information regarding water flow measurement devices 118 to be associated with the defined geographic region 202. The information received in 906 may indicate which water flow measurement devices 118 measure an amount of water flowing to a corresponding set of water distribution devices 120. For example, the information received in 906 may indicate that a meter M1 (see FIG. 3) measures the amount of water provided to distribution devices D1 and D2. The information received in 906 may also include or have associated therewith information identifying the water flow measurement device(s) 118 being registered. The information may be sent by the mobile device 102 and received in 906 by the network device 106 and/or the server 108.

The method 900 may also include receiving 908 information indicating locations of the set of moisture sensors 112 in the defined geographic region 202. The information indicating locations of the set of moisture sensors 112 may have the format described above with respect to receiving 904 the locations of the water distribution devices 120. In 908, the information may be received from the mobile device 102. For instance, information indicating a location of a given moisture sensor may be generated by the mobile device 102 based on information received by a global positioning system receiver of the mobile device 102. A user may interact with the user interface 122 to provide an input confirming the location of each of the set of moisture sensors 112 as they are placed.

In 910, the network device 106 and/or the server 108 may associate the information received in 902, 904, and 906 with locations or areas in the defined geographic region 202. The region image 126 may be obtained and the system (e.g., network device 106, server 108) may associate the information received in 902 with areas in the region image 126 to define the plurality of zones 210. The system may also associate the information received in 904 and 908 regarding locations of the water distribution devices 120 with locations in the defined geographic region 202. As one example, the information received in 904 and 908 may be associated with locations in the region image 126. The information received in 906 may also be associated with particular zones of the defined geographic region 202 or with corresponding water distribution devices 120.

Figure 10:
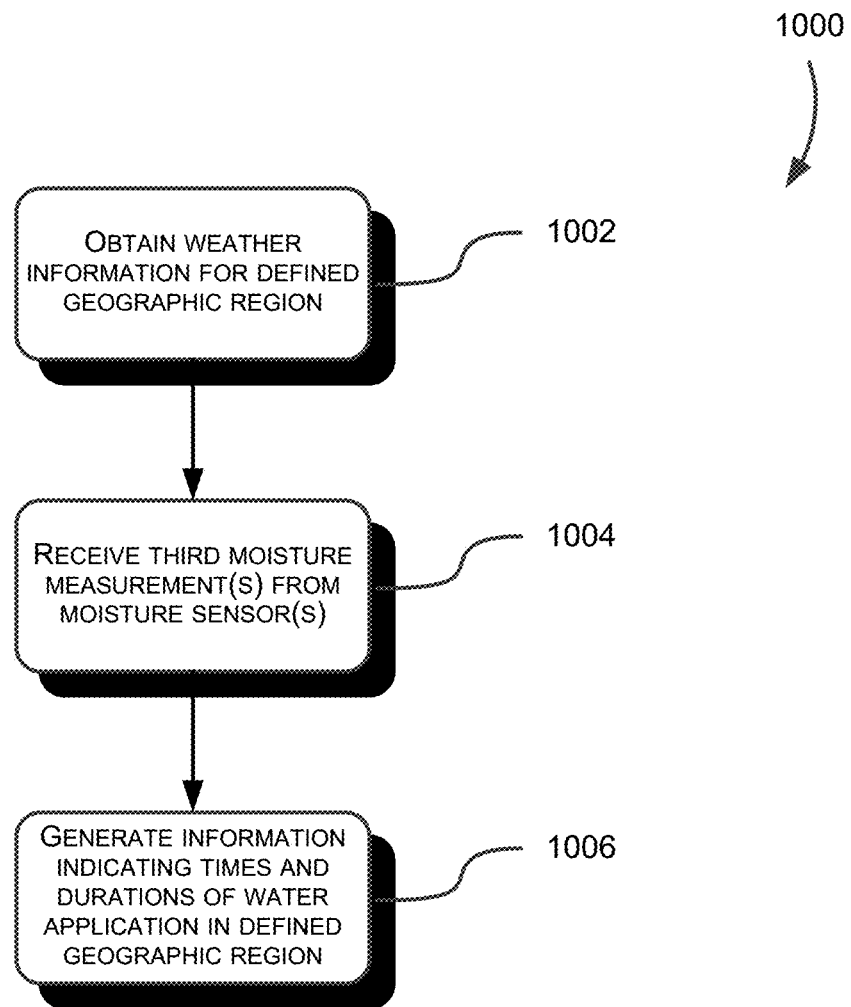
FIG. 10 is a method for generating the schedule information.

FIG. 10 shows a method 1000 for generating schedule information according to one or more embodiments. The method 1000 may be performed as part of generating 710 the schedule information of the method 700. The method 1000 may be performed by one or more systems of the environment 100, such as the network device 106 or the server 108. The method 1000 is not intended to include all operations performed by systems in the environment 100 and, as such, may include additional operations not described or depicted in the method 1000 or may omit some operations thereof. Some or all of the operations described with respect to the method 1000 may be initiated in response to communications sent by the mobile device 102, such as by interacting with the user interface 122.

The method 1000 includes obtaining 1002 weather information for the defined geographic region 202. The weather information includes information indicating forecasted weather and meteorological conditions for the defined geographic region 202 for a future period of time. The weather information may include information regarding forecasted precipitation, temperatures, wind, and cloud cover, by way of non-limiting example. The server 108 or network device 106 may obtain the weather information from a remote server of a weather authority (e.g., NOAA, Accuweather®).

The method 1000 may further include receiving 1004 a set of third moisture measurements from the set of moisture sensors 112. The set of third moisture measurements may be obtained at a time after the efficiency model is generated in 708 of the method 700. In some embodiments, the set of third moisture measurements received in 1004 may include or have associated therewith additional measurements obtained by the set of moisture sensors 112, such as temperature measurements and ambient light measurements. The set of third moisture measurements may include a measurement obtained by some or all of the set of moisture sensors 112.

At 1006, the method 1000 may include generating the schedule information indicating times at which and durations for which portions of the defined geographic region 202 are to be watered. The schedule information may be based on the set of third moisture measurements and the efficiency model. For example, the network device 106 may determine based on a set of efficiency metrics for a first zone in the defined geographic region 202, that a certain amount of water should be applied to the first zone in the morning for a particular duration. The network device 106 may determine that a second zone currently has sufficient moisture to last into the afternoon, but should be watered in the evening for a longer duration. As another example, the schedule information may indicate that watering is not necessary for a particular period of time as a result of a high likelihood of precipitation over a period of time. In some embodiments, the network device 106 may generate schedule information specifying amounts of water to be applied to areas within zones or areas extending across adjacent zones to improve efficiency.

The schedule information may be generated according to a particular efficiency metric corresponding to conditions detected for areas in the defined geographic region 202. For instance, an efficiency metric in the efficiency model corresponding to a certain location may be selected based on current or forecasted temperatures.

The schedule information may include control information for causing the network device 106 to send communications to one or more water distribution devices 120 at times specified in the schedule information. The communications sent by the network device 106 to the water distribution devices 120 may cause the water distribution devices 120 to transition to a different state permitting or preventing the flow of water therethrough.

The method 1000 may be performed periodically to update the schedule information based on changes to the efficiency model or changes in forecasted weather. In some embodiments, the server 108 may generate the schedule information according to the foregoing method 1000, which the server 108 may then send to the network device 106 and/or the mobile device 102 over the network 114.

Figure 11:
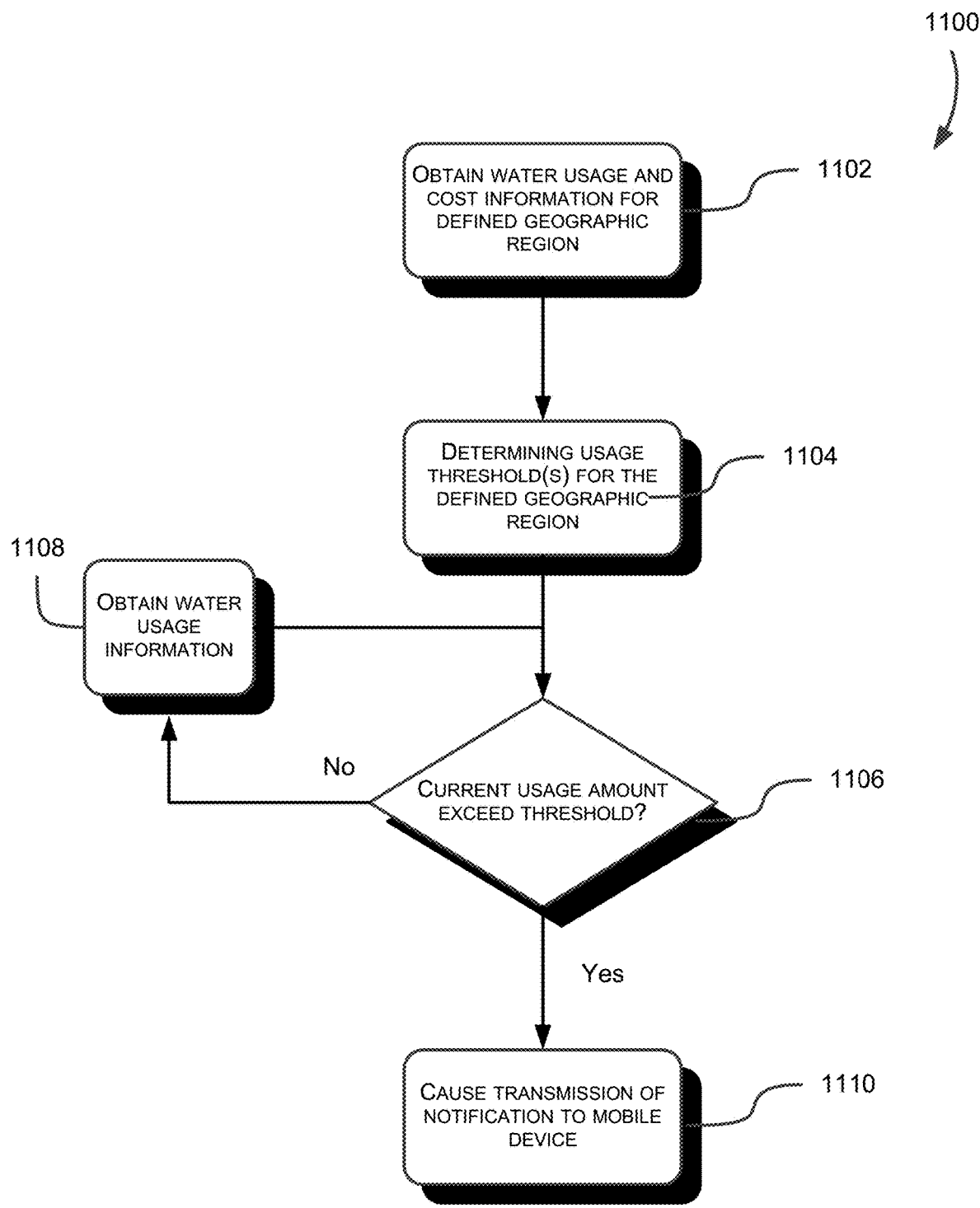
FIG. 11 is a method for notifying a user that water usage in the defined geographic region exceeds a threshold.

FIG. 11 shows a method 1100 for operation using water usage thresholds according to one or more embodiments. The method 1100 may be performed by one or more appropriate systems of the environment 100 and in connection with performance of the method 700.

The method 1100 includes obtaining 1004 water usage and cost information for the defined geographic region 202. The network device 106 or server 108 may obtain the water usage and cost information from a server of a municipal water authority by, for example, submitting a request for such information in connection with account information of a user. The water usage and cost information may indicate an amount of water used in the defined geographic region 202 for a current billing cycle as well as cost information indicating per unit costs of water usage for various ranges of water usage. As described with respect to FIG. 11 and elsewhere herein, the cost information may specify different cost structures for different cumulative amounts water usage for the defined geographic region 202.

The method also includes determining 1104 a threshold for the defined geographic region 202. The threshold may correspond to the threshold 504 or the cost thresholds 514 discussed with respect to FIG. 5 and elsewhere herein. The water usage threshold may be set by the user or may be set by a user via the interface element 506, or may be automatically determined by the network device 106 or the server 108 based on usage history and/or cost structures for water usage. For example, a threshold may be set corresponding to a standard deviation from an average amount of water usage for the user and for the time of year.

Next, at 1106, the method 1100 involves determining whether a current usage amount exceeds the threshold set in 1104. The usage amount may be a cost for a billing period or a cumulative amount of water used for a certain period of time. If the usage amount does not exceed the threshold, the method 1100 proceeds to obtaining 1108 additional water usage information at a later time, and determining 1106 once again whether the water usage exceeds the threshold set based on the water usage information.

As a result of determining that the current usage amount exceeds the threshold, the method 1100 proceeds to causing 1110 transmission of a notification to the mobile device 102 regarding a usage violation. The notification may be transmitted to the mobile device 102 by the server 108 over the network 114 or by the network device 106 over the LAN 116. The notification may notify or warn the user that a current usage level exceeds a particular threshold and may present options or recommendations for adjusting the schedule 602 accordingly. By setting and adjusting thresholds and presenting notifications to a user regarding usage levels, the user can be automatically warned about excessive usage without having to access a website of a municipal water utility or other such provider.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
receiving, by a computer system over a network, first moisture measurements from a set of moisture sensors indicating amounts of moisture measured at first locations in a defined geographic region at a first time;
determining, by the computer system, an amount of water applied to the defined geographic region over a first period of time after the first time;
receiving, by the computer system over the network, second moisture measurements from the set of moisture sensors indicating amounts of moisture measured at the first locations in the defined geographic region at a second time after the first period of time;
generating, by the computer system, an efficiency model of the defined geographic region based on the set of first moisture measurements, the set of second moisture measurements, and the amount of water applied;
generating, by the computer system, schedule information indicating future periods of time at which water is to be applied to areas in the defined geographic region based on the efficiency model;
sending the schedule information over the network; and
receiving information identifying a plurality of zones of the defined geographic region and information indicating second locations of a set of water distribution devices in the defined region, wherein the amount of water is applied by the set of water distribution devices.

2. The method of claim 1, further comprising:
receiving information defining a plurality of zones of the defined geographic region and information indicating the first locations of the set of moisture sensors; and
associating, in memory of the computer system, the first locations of each of the set of moisture sensors and the information defining the plurality of zones with areas in a region image corresponding to the defined geographic region.

3. The method of claim 1, wherein the efficiency model is generated based on differences, for each of the set of sensors, between corresponding measurements of the set of second moisture measurements and the set of first moisture measurements, and based on the amount of water applied over the period of time.

4. The method of claim 1, further comprising:
obtaining weather forecast information for the defined geographic region;
receiving, by the computer system over the network, third moisture measurements from the set of moisture sensors indicating the amounts of moisture measured at the first locations in the defined geographic region at a third time after the second time; and
generating the schedule information based on the efficiency model, the weather forecast information, and the third moisture measurements.

5. The method of claim 1, wherein the schedule information includes instructions for a network device connected to a second network to transmit a communication at a defined time causing one or more devices to apply water to the defined geographic region, and instructions for the network device to transmit a communication at a second defined time causing the one or more devices to stop applying water to the defined geographic region.

6. The method of claim 1, further comprising:
receiving, by the computer system, over the network, third moisture measurements from the set of moisture sensors indicating the amounts of moisture measured at the first locations in the defined geographic region at a third time after the second time; and
sending a communication causing a second amount of water to be applied to the defined geographic region in response to receiving the third moisture measurements.

7. The method of claim 1, wherein the efficiency model includes a plurality of efficiency metrics for the first locations in the defined geographic region, the efficiency model being a data structure representative of a response of soil at the first locations in the defined geographic region to the application of amounts of water.

8. A method, comprising:
receiving, by a computer system over a network, first moisture measurements from a set of moisture sensors indicating amounts of moisture measured at first locations in a defined geographic region at a first time;
determining, by the computer system, an amount of water applied to the defined geographic region over a first period of time after the first time;
receiving, by the computer system over the network, second moisture measurements from the set of moisture sensors indicating amounts of moisture measured at the first locations in the defined geographic region at a second time after the first period of time;
generating, by the computer system, an efficiency model of the defined geographic region based on the set of first moisture measurements, the set of second moisture measurements, and the amount of water applied;
generating, by the computer system, schedule information indicating future periods of time at which water is to be applied to areas in the defined geographic region based on the efficiency model;
sending the schedule information over the network;

receiving a communication indicating amounts of water applied in the defined geographic region at one or more second periods of time after the first period of time;
storing, in memory, current cumulative usage information representative of the amounts of water applied at the one or more second periods of time; and
transmitting, to a second computing system over the network, a notification as a result of current cumulative usage exceeding a usage threshold defined in the memory.

9. A method, comprising:
receiving, by a computer system over a network, first moisture measurements from a set of moisture sensors indicating amounts of moisture measured at first locations in a defined geographic region at a first time;
determining, by the computer system, an amount of water applied to the defined geographic region over a first period of time after the first time;
receiving, by the computer system over the network, second moisture measurements from the set of moisture sensors indicating amounts of moisture measured at the first locations in the defined geographic region at a second time after the first period of time;
generating, by the computer system, an efficiency model of the defined geographic region based on the set of first moisture measurements, the set of second moisture measurements, and the amount of water applied;
generating, by the computer system, schedule information indicating future periods of time at which water is to be applied to areas in the defined geographic region based on the efficiency model;
sending the schedule information over the network;
determining, for each zone of the plurality of zones, a usage threshold based on the efficiency model and cumulative usage information representative of the amounts of water applied at one or more second periods of time after the first period of time, wherein the scheduling information provides a schedule of water usage below the usage threshold.

10. A method, comprising:
receiving, by a computer system over a network, first moisture measurements from a set of moisture sensors indicating amounts of moisture measured at first locations in a defined geographic region at a first time;
determining, by the computer system, an amount of water applied to the defined geographic region over a first period of time after the first time;
receiving, by the computer system over the network, second moisture measurements from the set of moisture sensors indicating amounts of moisture measured at the first locations in the defined geographic region at a second time after the first period of time;
generating, by the computer system, an efficiency model of the defined geographic region based on the set of first moisture measurements, the set of second moisture measurements, and the amount of water applied;
generating, by the computer system, schedule information indicating future periods of time at which water is to be applied to areas in the defined geographic region based on the efficiency model;
sending the schedule information over the network;
determining, for each zone of the plurality of zones, a usage threshold based on the efficiency model and cumulative usage information representative of the amounts of water applied at one or more second periods of time after the first period of time;

receiving a communication indicating amounts of water applied in the defined geographic region at one or more second periods of time after the first period of time; and transmitting, to a second computing system over the network, a communication indicating a violation of a water usage restriction as a result of determining that the amounts of water applied at the one or more second periods of time exceed the usage threshold.

11. A system, comprising:

one or more processors;

a first network adapter configured to communicate over a first network; and memory storing a set of instructions that, as a result of execution by the one or more processors, cause the system to:

receive, via the first network adapter, first moisture measurements by a set of moisture sensors indicating amounts of moisture measured at first locations in a defined geographic region at a first time;

determine an amount of water applied to the defined geographic region over a period of time after the first time;

receive, via the first network adapter, second moisture measurements from the set of moisture sensors indicating the amounts of moisture measured at the first locations in the defined geographic region at a second time after the period of time;

obtain schedule information indicating future periods of time at which water is to be applied to areas in the defined geographic region based on an efficiency model of the defined geographic region, the efficiency model being generated based on the set of first moisture measurements, the set of second moisture measurements, and the amount of water applied;

send the schedule information to a mobile device over the first network; and generate the efficiency model based on differences, for each of the sets of sensors, between corresponding measurements of the set of second moisture measurements and the set of first moisture measurements, and based on the amount of water applied over the period of time.

12. The system of claim 11, wherein the memory stores further instructions that, as a result of execution by the one or more processors, cause the system to:

obtain weather forecast information for the defined geographic region;

receive, over the network, third moisture measurements from the set of moisture sensors indicating the amounts of moisture measured at the first locations in the defined geographic region at a third time after the second time; and generate the schedule information based on the efficiency model, the weather forecast information, and the third moisture measurements.

13. The system of claim 11, wherein the memory stores further instructions that, as a result of execution by the one or more processors, cause the system to:

transmit a communication, over the first network, at a defined time specified in the scheduling information to one or more water distribution devices to apply water to the defined geographic region, and transmit a communication at a second defined time specified in the scheduling information to stop applying water to the defined geographic region.

14. A system, comprising:

one or more processors;

a first network adapter configured to communicate over a first network; and memory storing a set of instructions that, as a result of execution by the one or more processors, cause the system to:

receive, via the first network adapter, first moisture measurements by a set of moisture sensors indicating amounts of moisture measured at first locations in a defined geographic region at a first time;

determine an amount of water applied to the defined geographic region over a period of time after the first time;

receive, via the first network adapter, second moisture measurements from the set of moisture sensors indicating the amounts of moisture measured at the first locations in the defined geographic region at a second time after the period of time;

obtain schedule information indicating future periods of time at which water is to be applied to areas in the defined geographic region based on an efficiency model of the defined geographic region, the efficiency model being generated based on the set of first moisture measurements, the set of second moisture measurements, and the amount of water applied;

send the schedule information to a mobile device over the first network;

a second network adapter configured to communicate over a second network, wherein the memory stores further instructions that, as a result of execution by the one or more processors, cause the system to:

receive, from the mobile device over the first network, location information identifying a location of the defined geographic region; and send, over the second network, a request including the location information to a remote server to obtain a region image of the defined geographic region.

15. The system of claim 14, wherein the instructions, as a result of execution by the one or more processors, further cause the system to:

receive, from the mobile device over the first network, a communication including information defining a plurality of zones in the defined geographic region, and information indicating locations of one or more devices in the defined geographic region; and define, based on the communication, areas in the region image corresponding to the plurality of zones and device locations in the region image corresponding to the locations of the one or more devices.

16. A system, comprising:

one or more processors;

a first network adapter configured to communicate over a first network; and memory storing a set of instructions that, as a result of execution by the one or more processors, cause the system to:

receive, via the first network adapter, first moisture measurements by a set of moisture sensors indicating amounts of moisture measured at first locations in a defined geographic region at a first time;

determine an amount of water applied to the defined geographic region over a period of time after the first time;

receive, via the first network adapter, second moisture measurements from the set of moisture sensors indicating the amounts of moisture measured at the first locations in the defined geographic region at a second time after the period of time;

obtain schedule information indicating future periods of time at which water is to be applied to areas in the defined geographic region based on an efficiency model of the defined geographic region, the efficiency model being generated based on the set of first moisture measurements, the set of second moisture measurements, and the amount of water applied;

send the schedule information to a mobile device over the first network;

a second network adapter configured to communicate over a second network, wherein the memory stores further instructions that, as a result of execution by the one or more processors, cause the system to:

send, to a remote server over the second network, a request for the schedule information, the request including information regarding the first moisture measurements, the second moisture measurement, and the amount of water applied to the geographic region over the period of time; and receive, over the second network, the schedule information from the remote server in response to the request.

17. A system, comprising:

one or more processors;

a first network adapter configured to communicate over a first network; and memory storing a set of instructions that, as a result of execution by the one or more processors, cause the system to:

receive, via the first network adapter, first moisture measurements by a set of moisture sensors indicating amounts of moisture measured at first locations in a defined geographic region at a first time;

determine an amount of water applied to the defined geographic region over a period of time after the first time;

receive, via the first network adapter, second moisture measurements from the set of moisture sensors indicating the amounts of moisture measured at the first locations in the defined geographic region at a second time after the period of time;

obtain schedule information indicating future periods of time at which water is to be applied to areas in the defined geographic region based on an efficiency model of the defined geographic region, the efficiency model being generated based on the set of first moisture measurements, the set of second moisture measurements, and the amount of water applied;

send the schedule information to a mobile device over the first network;

calculate a moisture differential based on the set of first moisture measurements and the set of second moisture measurements, generate an efficiency model based on the moisture differential and the amount of water applied, and generate the schedule information based on the efficiency model.

18. A non-transitory computer-readable medium storing instructions that are executable on one or more processors of a system to cause the system to perform operations including:

receiving, by the system over a network, first moisture measurements by a set of moisture sensors indicating amounts of moisture measured at first locations in a defined geographic region at a first time;

determining, by the system, an amount of water applied to the defined geographic region over a period of time after the first time;

receiving, by the system over the network, second moisture measurements from the set of moisture sensors indicating amounts of moisture measured at the first locations in the defined geographic region at a second time after the period of time;

generating, by the system, an efficiency model of the defined geographic region based on the set of first moisture measurements, the set of second moisture measurements, and the amount of water applied;

generating, by the system, schedule information indicating future periods of time at which water is to be applied to areas in the defined geographic region based on the efficiency model;

sending the schedule information over the network to a mobile device;

obtain information defining a plurality of zones of the defined geographic region and information indicating the first locations of the set of moisture sensors; and associating, in memory of the computer system, the first locations of each of the sets of moisture sensors and the information defining the plurality of zones with areas in a region image corresponding to the defined geographic region.

19. The non-transitory computer-readable medium of claim 18, wherein the instructions are executable to further cause the system to:

receive, over the network, third moisture measurements from the set of moisture sensors indicating the amounts of moisture measured at the first locations in the defined geographic region at a third time after the second time; and send a communication that causes a second amount of water to be applied to the defined geographic region in response to receiving the third moisture measurements.

* * * * *